(12) United States Patent
Masahiro

(10) Patent No.: US 9,703,177 B2
(45) Date of Patent: Jul. 11, 2017

(54) LENS BARREL AND CAMERA

(71) Applicant: SAMSUNG ELECTRONICS CO., LTD., Suwon-si (KR)

(72) Inventor: Shirono Masahiro, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 15/008,983

(22) Filed: Jan. 28, 2016

(65) Prior Publication Data

US 2016/0216594 A1   Jul. 28, 2016

(30) Foreign Application Priority Data

Jan. 28, 2015  (JP) .................................. 2015-014470
Nov. 12, 2015  (JP) .................................. 2015-221718
Dec. 17, 2015  (KR) ........................ 10-2015-0181086

(51) Int. Cl.
| | |
|---|---|
| *G03B 17/12* | (2006.01) |
| *G02B 27/64* | (2006.01) |
| *G02B 7/04* | (2006.01) |
| *G03B 3/10* | (2006.01) |
| *G03B 5/02* | (2006.01) |

(52) U.S. Cl.
CPC ............... *G03B 17/12* (2013.01); *G02B 7/04* (2013.01); *G02B 27/646* (2013.01); *G03B 3/10* (2013.01); *G03B 5/02* (2013.01); *G03B 2205/0015* (2013.01)

(58) Field of Classification Search
USPC ......................................................... 396/130
See application file for complete search history.

(56) References Cited

U.S. PATENT DOCUMENTS

| | | |
|---|---|---|
| 5,842,052 A | 11/1998 | Okano |
| 6,016,221 A | 1/2000 | Kaneda et al. |
| 6,295,412 B1 | 9/2001 | Katano et al. |
| 6,970,305 B2 | 11/2005 | Katagishi et al. |

(Continued)

FOREIGN PATENT DOCUMENTS

| | | |
|---|---|---|
| JP | 10-239725 A | 9/1998 |
| JP | 2013-45068 A | 3/2013 |

OTHER PUBLICATIONS

International Search Report dated Apr. 29, 2016 issued by International Searching Authority in counterpart International Application No. PCT/KR2016/000777.

(Continued)

*Primary Examiner* — Clayton E LaBalle
*Assistant Examiner* — Linda B Smith
(74) *Attorney, Agent, or Firm* — Sughrue Mion, PLLC

(57) ABSTRACT

A camera includes a lens barrel including a first lens frame that supports a first lens and is configured to move in a direction perpendicular to an optical axis of the lens barrel, a second lens frame that supports a second lens and is configured to move in an optical-axis direction which is parallel to the optical axis; a first lock member configured to connect with the first lens frame to restrict movement of the first lens frame; a second lock member configured to connect with the second lens frame to restrict movement of the second lens frame; a connection portion that connects the first lock member and the second lock member; and an actuator configured to move one of the first lock member and the second lock member and thereby control the first lock member and the second lock member to restrict the movement.

15 Claims, 43 Drawing Sheets

(56) References Cited

U.S. PATENT DOCUMENTS

2007/0019100 A1  1/2007  Mitani et al.
2010/0027138 A1  2/2010  Terada
2011/0267711 A1  11/2011  Doi

OTHER PUBLICATIONS

Written Opinion dated Apr. 29, 2016 issued by International Searching Authority in counterpart International Application No. PCT/KR2016/000777.

LENS BARREL AND CAMERA

CROSS-REFERENCE TO RELATED APPLICATIONS

This application claims priority from Japanese Patent Application No. 2015-014470, filed on Jan. 28, 2015 and Japanese Patent Application No. 2015-221718, filed on Nov. 12, 2015, in the Japanese Patent Office, and Korean Patent Application No. 10-2015-0181086, filed on Dec. 17, 2015, in the Korean Intellectual Property Office, the disclosures of which are incorporated herein in their entirety by reference.

BACKGROUND

1. Field

The exemplary embodiments disclosed herein relate to lens barrels and cameras.

2. Description of the Related Art

In order to drive a lens of a camera, a voice coil motor (VCM) having an excellent response time may be used as an actuator. However, the VCM may fail to support the lens when no electrical signal is applied to the VCM. Accordingly, technology is being developed for restricting the movement of a lens in a camera when the camera is powered off.

For example, Japanese Patent Publication JP 1998-239725 discloses a camera-integrated video tape recorder (VTR) including a plano-concave lens and a plano-convex lens that may move in a direction perpendicular to an optical axis. A first lock hole for locking the plano-convex lens is formed at a first VCM which drives the plano-convex lens, and a second lock hole for locking the plano-concave lens is formed at a second VCM which drives the plano-concave lens. By operation of a motor, a first lock pin is moved and inserted into the first lock hole and a second lock pin is moved and inserted into the second lock hole to lock the plano-convex lens and the plano-concave lens. In this manner, the plano-convex lens and the plano-concave lens which move in a same direction are locked by one motor.

SUMMARY

Accordingly, exemplary embodiments disclosed herein provide lens barrels and cameras, which may reduce the cost and complexity of an actuator for locking the movement of lens frames moving in different directions or the movement of a diaphragm unit and a lens frame moving in different directions.

Additional aspects will be set forth in part in the description which follows and, in part, will be apparent from the description, or may be learned by practice of the presented exemplary embodiments.

According to an aspect of an exemplary embodiment, a camera includes a lens barrel including: a first lens frame that supports a first lens and is configured to move in a direction perpendicular to an optical axis of the lens barrel; a second lens frame that supports a second lens and is configured to move in an optical-axis direction which is parallel to the optical axis; a first lock member configured to move in a direction to connect with the first lens frame to restrict movement of the first lens frame in the direction perpendicular to the optical axis; a second lock member configured to move in a direction to connect with the second lens frame to restrict movement of the second lens frame in the optical-axis direction; a connection portion that connects the first lock member and the second lock member; and an actuator configured to move one of the first lock member and the second lock member and thereby control the first lock member and the second lock member to restrict the movement of the first lens frame and the second lens frame, respectively.

The first lock member may be configured to rotate about the optical axis and may be disposed concentrically with an optical-axis center of the first lens frame; and the first lock member may be configured to restrict the movement of the first lens frame in the direction perpendicular to the optical axis by rotation about the optical axis.

The first lens frame may include projections protruding in the optical-axis direction, and the first lock member may include contact portions at an outer peripheral surface of the first lock member, the contact portions being configured to respectively contact the projections; and concave noncontact portions at the outer peripheral surface of the first lock member, the concave noncontact portions being configured to remain spaced apart from the projections; and by the rotation of the first lock member, the contact portions of the first lock member may be brought into contact respectively with the projections of the first lens frame to restrict the movement of the first lens frame in the direction perpendicular to the optical axis.

The second lock member may be configured to move in a direction which intersects with the optical axis to restrict the movement of the second lens frame in the optical-axis direction.

One of the second lock member and the second lens frame may include a lock projection extending in the direction intersecting with the optical axis; the other one of the second lock member and the second lens frame may include a lock groove to which the lock projection is connectable; and the lock projection may be configured to connect to the lock groove based on the movement of the second lock member in the direction to connect with the second lens frame, to restrict the movement of the second lens frame in the optical-axis direction.

The connection portion may include a pin that is provided on the first lock member; and a groove that is provided on the second lock member and extends in a direction intersecting with the movement direction of the second lock member and into which the pin is inserted.

The camera may further include a third lock member that interlocks with the first lock member, is movable in the optical-axis direction, and has a hole formed therein that is configured to receive at least one of the projections.

The third lock member may be configured to move in the optical-axis direction in an interlocking fashion with the first lock member according to rotation of the first lock member; and the hole may be fitted to the projection based on the movement of the third lock member in the optical-axis direction, to restrict the movement of the first lens frame in the direction perpendicular to the optical axis.

The camera may further include a cam groove provided on the first lock member and extending in a circumferential direction of the first lock member; and a follow pin provided on the third lock member, the follow pin being configured to follow a path of the cam groove, wherein the follow pin is configured to move in the optical-axis direction along the cam groove based on the rotation of the first lock member.

The second lock member may be configured to restrict the movement of the second lens frame in the optical-axis direction after the first lock member restricts the movement of the first lens frame in the direction perpendicular to the optical axis.

The first lock member may be configured to restrict the movement of the first lens frame in the direction perpendicular to the optical axis after the second lock member restricts the movement of the second lens frame in the optical-axis direction.

According to an aspect of another exemplary embodiment, a camera includes a lens barrel including: a lens unit including: a lens frame supporting a lens, and a lock member configured to move in a direction to connect with the lens frame to restrict movement of the lens frame; and a diaphragm unit including: a shade member; an actuator configured to move the shade member in a direction perpendicular to an optical axis of the lens barrel; and a drive force transmission member configured to transmit a drive force of the actuator to the shade member, wherein the drive force transmission member and the lock member are connected to each other.

The drive force transmission member may be configured to be rotated by the actuator to thereby generate rotation movement of the drive force transmission member; the rotation movement of the drive force transmission member may have a drive force transmission state that moves the shade member and a drive force non-transmission state that does not move the shade member; and the lock member may restrict the movement of the lens frame when the drive force transmission member is rotated and moved in the drive force non-transmission state.

The lens frame may be a focus lens frame configured to move in an optical-axis direction which is parallel to the optical axis; and the lock member may be a lock lever configured to restrict the movement of the lens frame in the optical-axis direction.

The camera may further include a vibration-proof compensation lens unit including: a vibration-proof compensation lens; a vibration-proof compensation lens frame supporting the vibration-proof compensation lens; and a lock ring configured to move in a direction to connect with the vibration-proof compensation lens frame to restrict movement of the vibration-proof compensation lens frame.

The lock lever and the lock ring may be connected to each other.

The vibration-proof compensation lens unit may further include a voice coil motor configured to drive the vibration-proof compensation lens frame.

The lens unit may further include a voice coil motor configured to drive the lens frame.

According to an aspect of another exemplary embodiment, a lens barrel includes: a first lens frame that supports a first lens and is configured to move in a direction perpendicular to an optical axis of the lens barrel; a second lens frame that supports a second lens and is configured to move in an optical-axis direction which is parallel to the optical axis; a first lock member configured to move in a direction to connect with the first lens frame to restrict movement of the first lens frame in the direction perpendicular to the optical axis; a second lock member configured to move in a direction to connect with the second lens frame to restrict movement of the second lens frame in the optical-axis direction; a connection portion that connects the first lock member to the second lock member; and an actuator configured to move one of the first lock member and the second lock member and thereby control the first lock member and the second lock member to restrict the movement of the first lens frame and the second lens frame, respectively.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
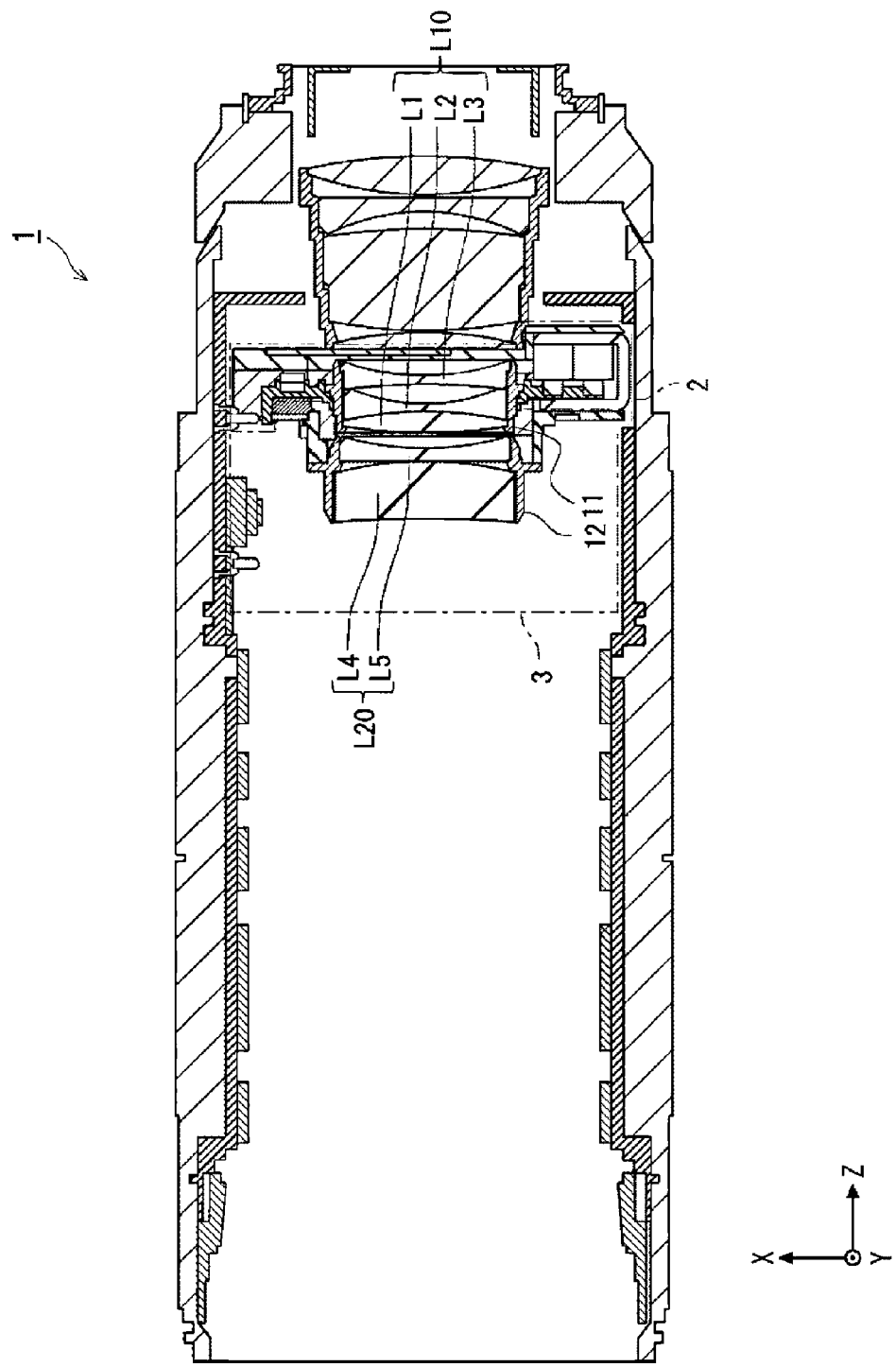
FIG. 1 is a cross-sectional view of a lens barrel according to Exemplary Embodiment 1.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the exemplary embodiments. As used herein, the term "and/or" includes any and all combinations of one or more of the associated listed items. Expressions such as "at least one of," when preceding a list of elements, modify the entire list of elements and do not modify the individual elements of the list.

In a lens barrel and a camera including the same, in the case of locking a lens frame that is movable in a direction perpendicular to an optical axis and a lens frame that is movable in an optical-axis direction, since the movement directions of the lens frames with respect to the optical axis are different from each other, an actuator (motor) may be used to restrict the movement of the lens frame in the direction perpendicular to the optical axis and an actuator (motor) may be used to restrict the movement of the lens frame in the optical-axis direction.

However, in the case of using separate actuators to lock lens frames, since at least two actuators are necessary for locking, the cost of providing separate actuators for locking the movement of lens frames is high.

Exemplary embodiments may provide lens barrels and cameras that may reduce the cost and complexity of actuators for locking the movement of lens frames that move in different directions. Also, exemplary embodiments may provide lens barrels and cameras that may reduce the cost and complexity of actuators for locking the movement of a diaphragm unit and a lens frame that move in different directions.

Exemplary Embodiment 1

Figure 2:
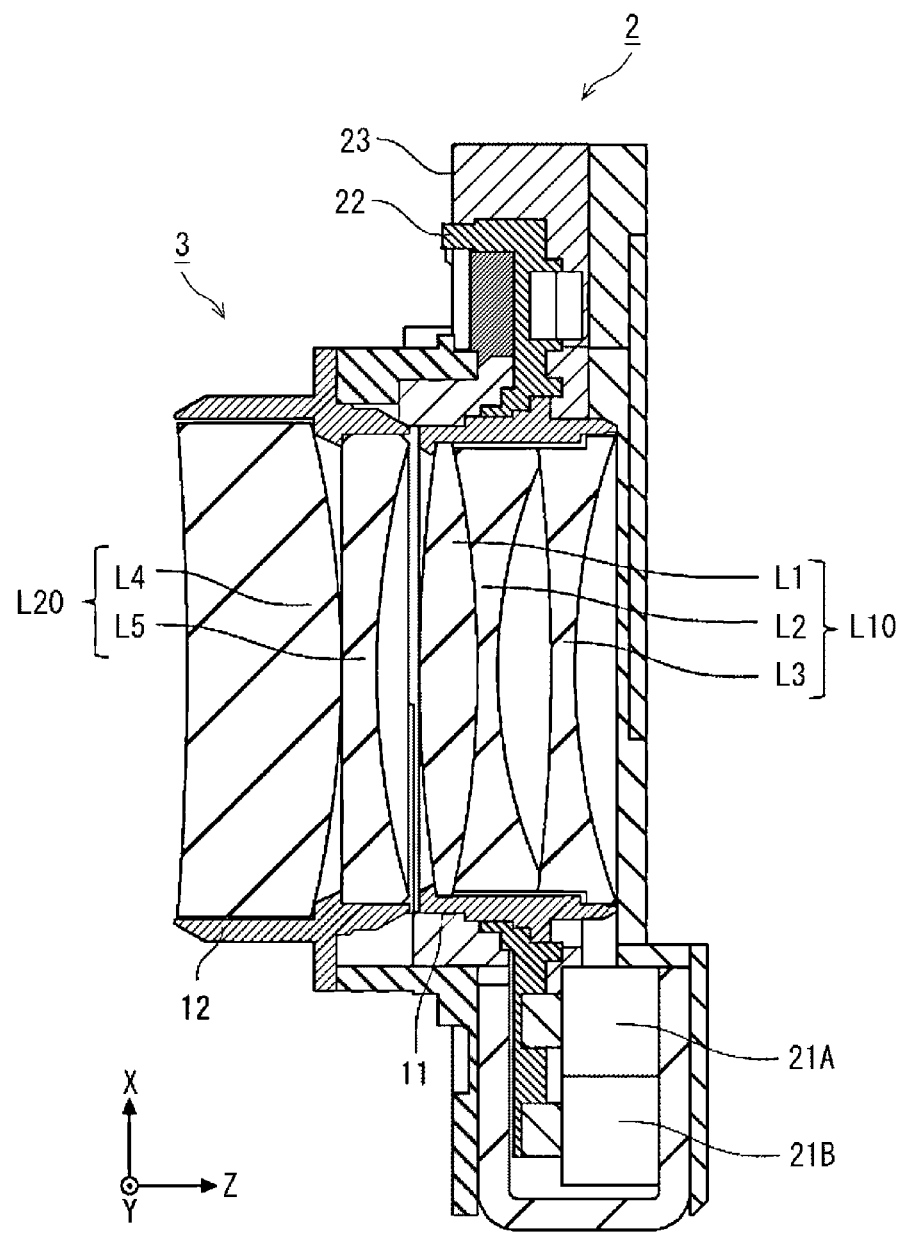
FIG. 2 is a cross-sectional view of a vibration-proof compensation lens unit and a focus lens unit.

Hereinafter, Exemplary Embodiment 1 will be described with reference to the drawings. As illustrated in FIGS. 1 and 2, a lens barrel 1 according to an exemplary embodiment includes: a vibration-proof compensation lens unit 2 including a vibration-proof compensation lens group L10; and a focus lens unit 3 including a focus lens group L20. The vibration-proof compensation lens group L10 may include vibration-proof compensation lenses L1, L2, and L3, and the focus lens group L20 may include focus lenses L4 and L5. The lens barrel 1 may be provided in a camera and may further include other suitable components in addition to the vibration-proof compensation lens unit 2 and the focus lens unit 3. For convenience's sake, FIGS. 1 and 2 illustrate only some of the configurations of the vibration-proof compensation lens unit 2 and the focus lens unit 3, but it is understood that many other configurations may also be used in accordance with other exemplary embodiments.

The vibration-proof compensation lens unit 2 and the focus lens unit 3 are adjacent to each other in a Z-axis direction. Also, in FIGS. 1 and 2, an X-axis direction and a Y-axis direction are perpendicular to an optical axis of the vibration-proof compensation lens group L10 and the focus lens group L20; and the Z-axis direction corresponds to an optical-axis direction that is parallel to the optical axis of the vibration-proof compensation lens group L10 and the focus lens group L20. Also, a Z-axis direction from the focus lens unit 3 toward the vibration-proof compensation lens unit 2 will be defined as a (+Z)-axis direction, and a Z-axis direction from the vibration-proof compensation lens unit 2 toward the focus lens unit 3 will be defined as a (−Z)-axis direction.

The vibration-proof compensation lens group L10 is supported by a vibration-proof compensation lens frame 11 (also referred to as a "first lens frame") of the vibration-proof compensation lens unit 2. The focus lens group L20 is supported by a focus lens frame 12 (also referred to as a "second lens frame") of the focus lens unit 3. Voice coil motors (VCMs) 21A and 21B drive the vibration-proof compensation lens frame 11 to move in the X-axis direction or the Y-axis direction.

Figure 3:
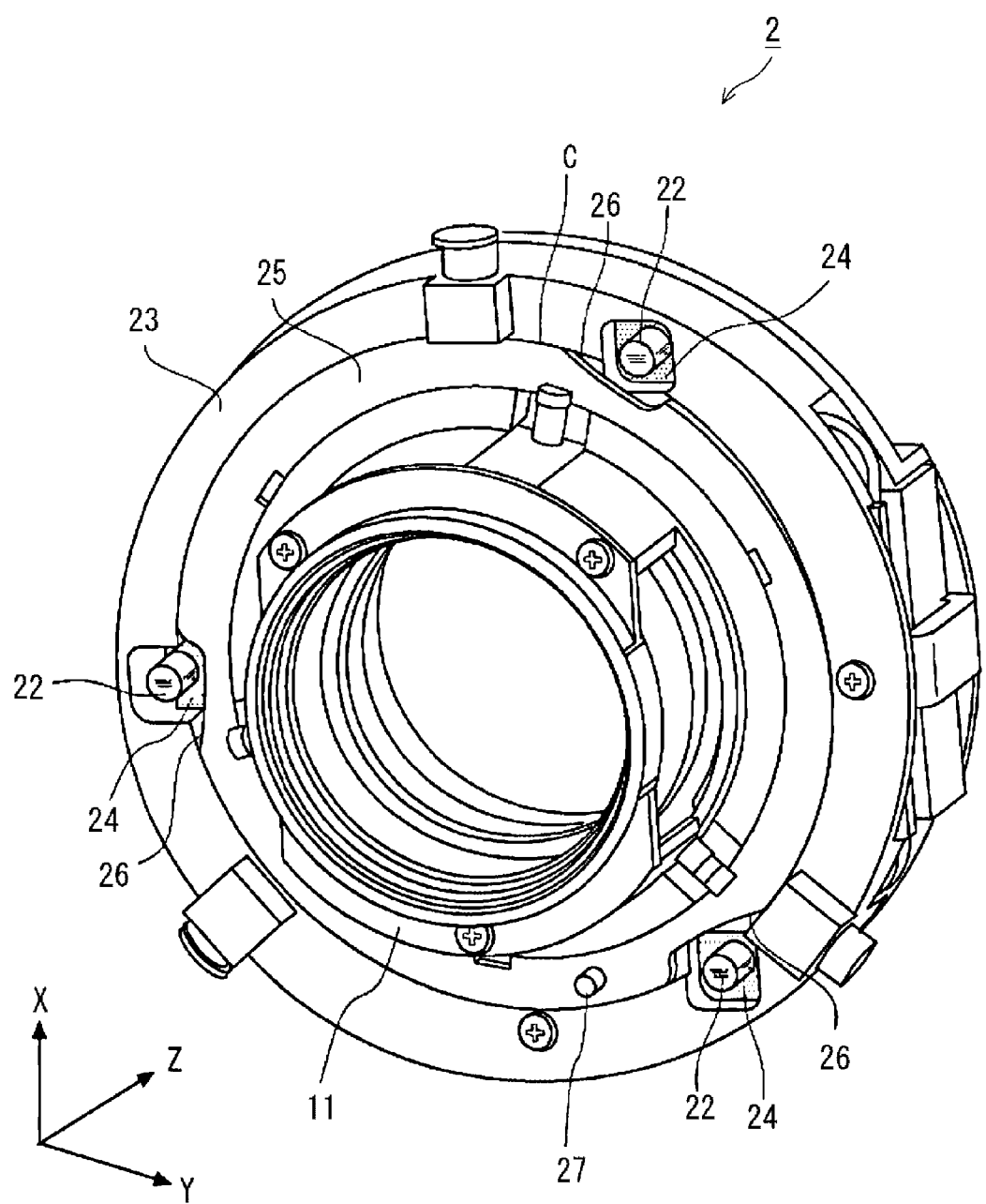
FIG. 3 is a perspective view of a vibration-proof compensation lens unit.
Figure 4:
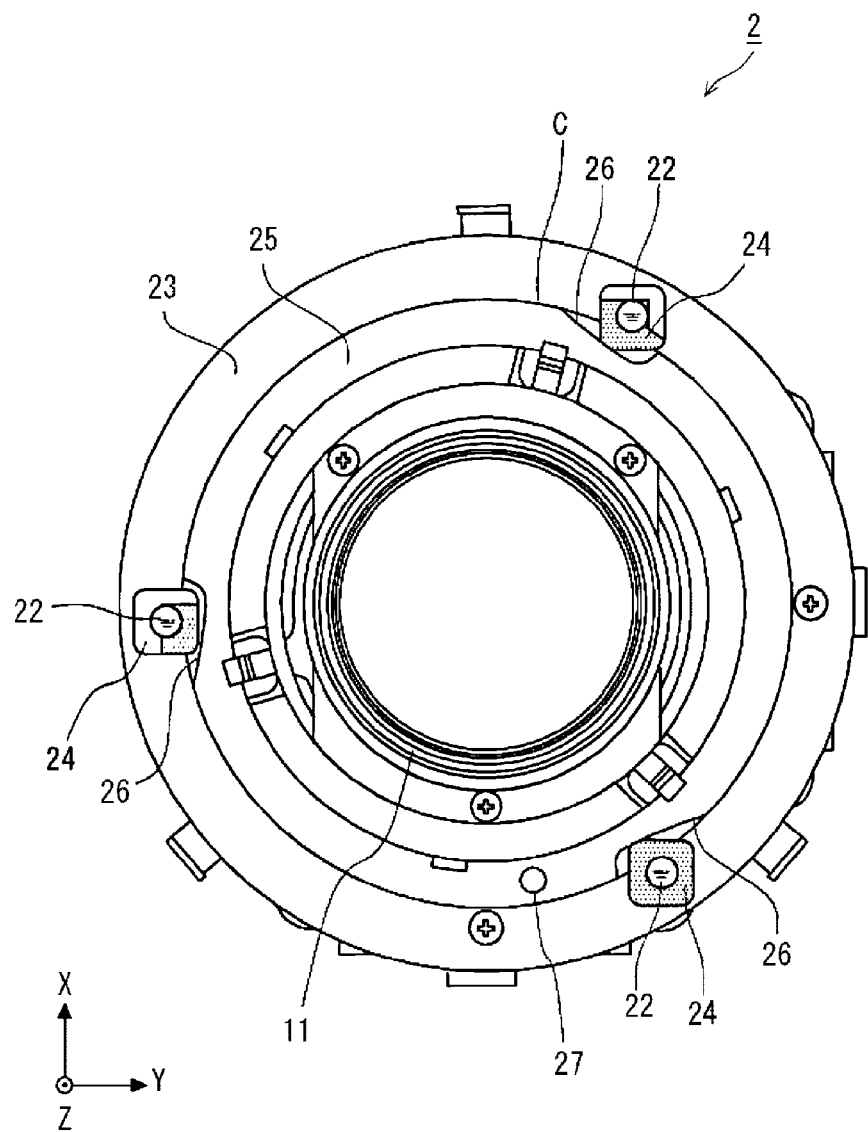
FIG. 4 is a front view of a vibration-proof compensation lens unit.

The configuration of the vibration-proof compensation lens unit 2 will be described below in more detail. As illustrated in FIGS. 3 and 4, a projection 22 is disposed at the outside of the vibration-proof compensation lens frame 11. For example, the projection 22 is fixedly installed at the outside of the vibration-proof compensation lens frame 11. The projection 22 protrudes in the (−Z)-axis direction. A plurality of projections 22 are disposed at the outside of the vibration-proof compensation lens frame 11 to be spaced apart from each other in a circumferential direction thereof. For example, three projections 22 are installed at a surface 23 of the vibration-proof compensation lens unit 2 facing the focus lens unit 3, and an operation region 24 is formed around each projection 22. The three projections 22 respectively form three points of a regular triangle; and a center axis of the vibration-proof compensation lens frame 11, that is, an optical axis of the vibration-proof compensation lens group L10, passes through a center of the regular triangle. Also, the surface 23 forms a plane perpendicular to the Z axis. It is understood that more or less than three projections 22 may be used in accordance with exemplary embodiments.

Also, a lock ring 25 (also referred to as a "first lock member") is disposed at the surface 23. The lock ring 25 is disposed substantially concentrically with an optical-axis center of the vibration-proof compensation lens frame 11. The lock ring 25 may rotate on the optical axis. The lock ring 25 includes, at an outer peripheral surface thereof, a circumferential surface C (also referred to as a "contact portion") that may contact the projection 22.

When the lock ring 25 rotates and thus the projection 22 connects or contacts with the circumferential surface C of the lock ring 25, the movement of the projection 22 is restricted. Accordingly, the movement of the vibration-proof compensation lens frame 11 in the X-axis direction and the Y-axis direction is restricted.

The lock ring 25 includes, at the outer peripheral surface thereof, a taper portion 26 (also referred to as a "noncontact portion") that may not contact the projection 22. The taper portion 26 may have a concave shape and connect with the circumferential surface C. Three taper portions 26 are disposed at positions corresponding to the projections 22. It is understood that more or less than three taper portions 26 may be used in accordance with exemplary embodiments.

When the lock ring 25 rotates and thus the taper portion 26 is located at a position facing the projection 22, the projection 22 may move. As illustrated in FIGS. 3 and 4, when the projection 22 does not connect or contact with the circumferential surface C of the lock ring 25, the projection 22 may move within the operation region 24 formed therearound. In this case, the vibration-proof compensation lens frame 11 may move in the X-axis direction and the Y-axis direction. Also, when the vibration-proof compensation lens frame 11 is located at the center of an operation region in the X-axis direction and the Y-axis direction, each projection 22 is located at a center portion of each operation region 24.

A lock pin 27 protruding in the (−Z)-axis direction on the circumference is formed at the lock ring 25.

Figure 5:
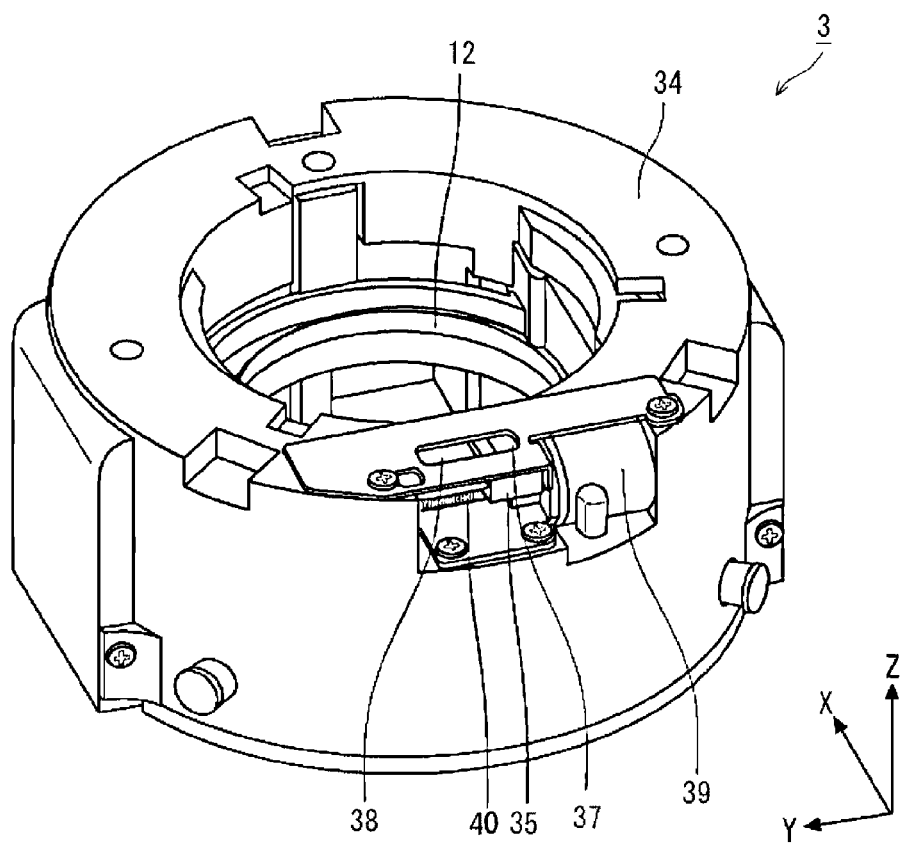
FIG. 5 is a perspective view of a focus lens unit.
Figure 6:
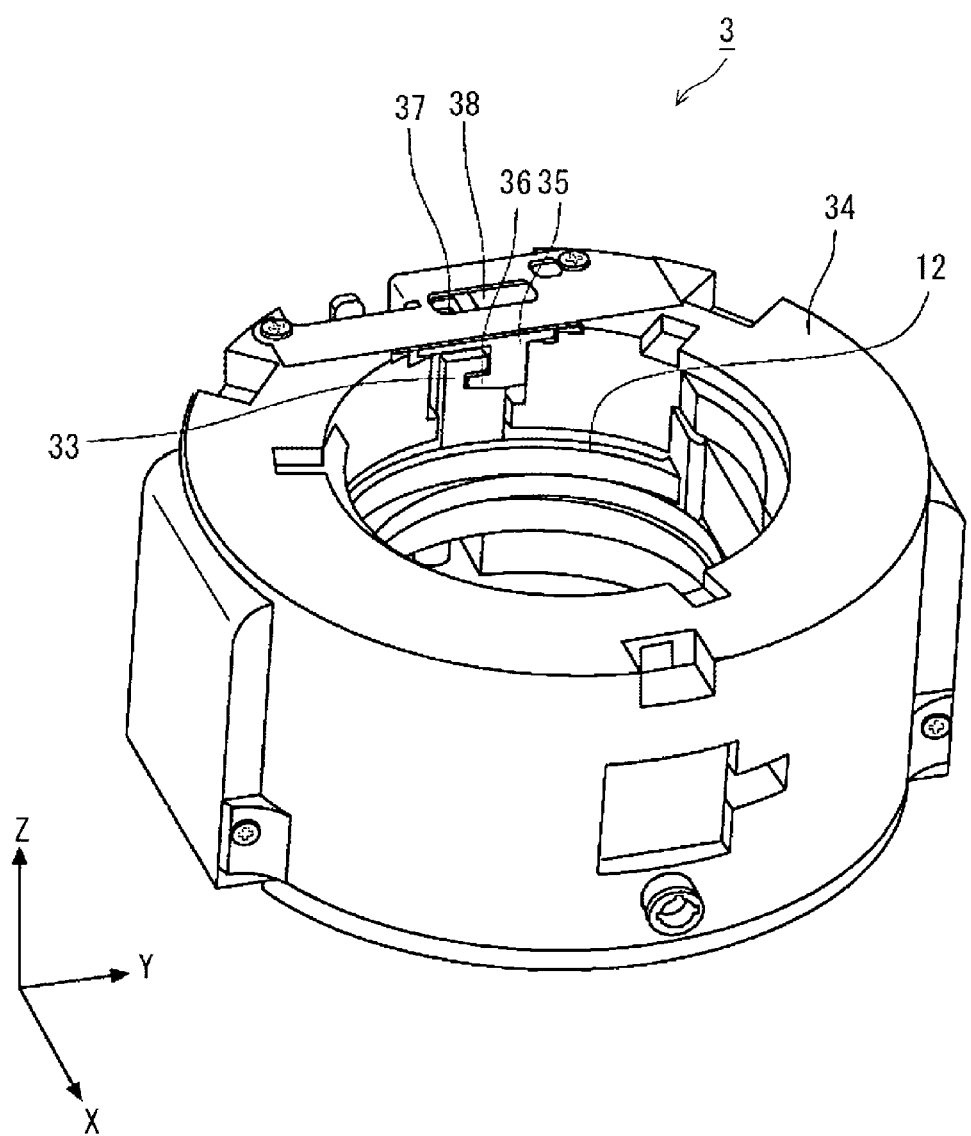
FIG. 6 is another perspective view of a focus lens unit.
Figure 7:
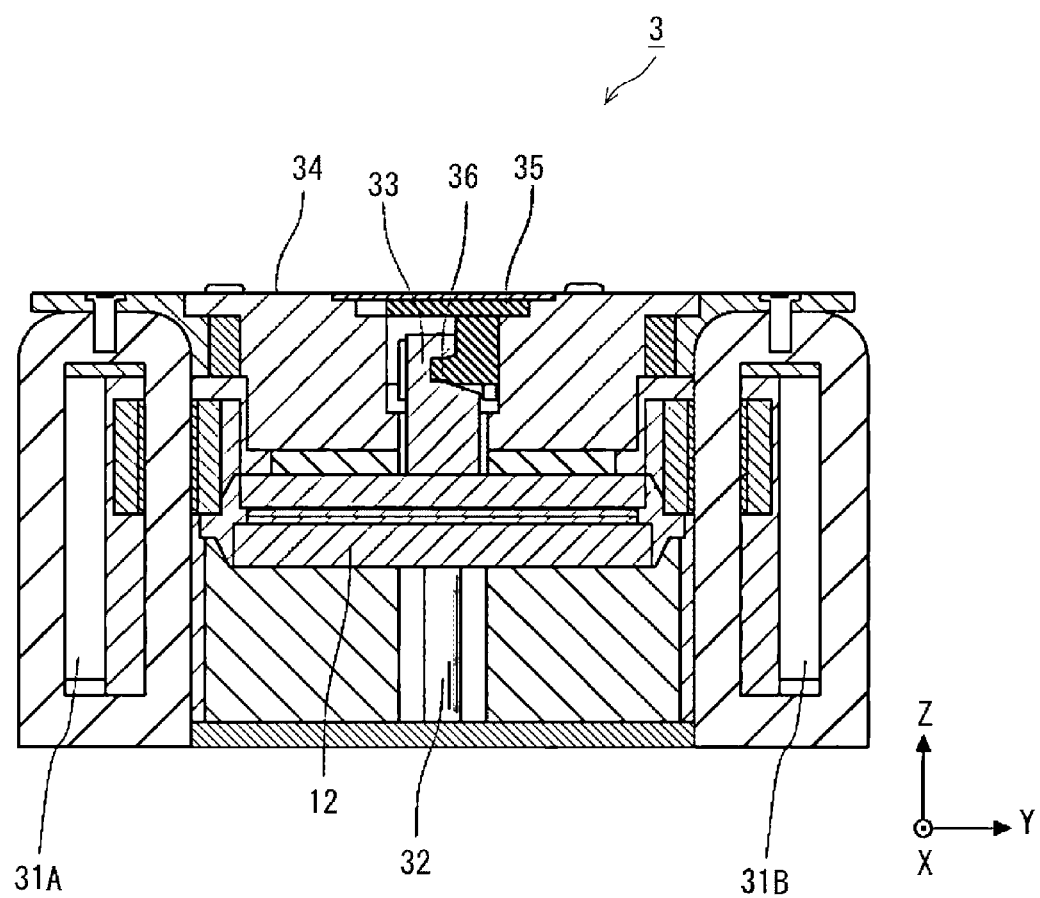
FIG. 7 is a cross-sectional view of a focus lens unit.

The configuration of the focus lens unit 3 will be described below in more detail. As illustrated in FIGS. 5 to 7, when VCMs 31A and 31B are driven, the focus lens frame 12 moves in the Z-axis direction along a guide shaft 32. Since the focus lens frame 12 moves in the Z-axis direction, a focus of the camera may be adjusted.

A lock groove 33 is installed at the focus lens frame 12. The lock groove 33 may be concave in a direction intersecting with the Z-axis direction. For example, the lock groove 33 may be concave in a circumferential direction of the optical axis. According to an exemplary embodiment, the term "concave" may refer to a recessed portion having any type of shape (e.g., semicircular, rectangular, etc.), and is not limited to being a curved shape.

A lock lever 35 (also referred to as a "second lock member") is disposed at a surface 34 of the focus lens unit 3 facing the vibration-proof compensation lens unit 2. At least a portion of the lock lever 35 includes a lock projection 36 having a shape corresponding to the lock groove 33. The lock projection 36 may extend in a direction intersecting with the Z-axis direction. For example, the lock projection 36 may extend in the Y-axis direction. The lock projection 36 of the lock lever 35 is connected with the lock groove 33 to restrict the movement of the focus lens frame 12 in the Z-axis direction. Also, in FIGS. 5 to 7, the lock groove 33 and the lock projection 36 are connected together.

Also, a groove 37, which the lock pin 27 formed at the lock ring 25 is connectable to or insertable into, is formed at the lock lever 35. The size of the groove 37 may be larger than the size of the lock pin 27. For example, the size of the groove 37 in the X-axis direction may be larger than the size of the lock pin 27 in the X-axis direction. The groove 37 may extend in the X-axis direction.

A slot 38 extending in the Y-axis direction is formed at the surface 34. The lock pin 27 is inserted into the groove 37 through the slot 38. The lock pin 27 and the groove 37 function as a connection portion that connects the lock ring 25 and the lock lever 35. The surface 34 forms a plane perpendicular to the Z axis.

The lock lever 35 is installed at a guide shaft 40 movable in the Y-axis direction. The guide shaft 40 is rotated by the driving of a motor (actuator) 39, and the lock lever 35 installed at the guide shaft 40 moves in the Y-axis direction. The motor 39 may be, for example, a step motor, although is not limited thereto, and may be other types of motors as well.

The operations of the VCMs 21A and 21B, the VCMs 31A and 31B, and the motor 39 described above are controlled by a control unit. The control unit may be, for example, a control unit of the camera including the lens barrel 1.

A process of locking the vibration-proof compensation lens frame 11 by the lock ring 25 and locking the focus lens frame 12 by the lock lever 35 will be described below.

Figure 8:
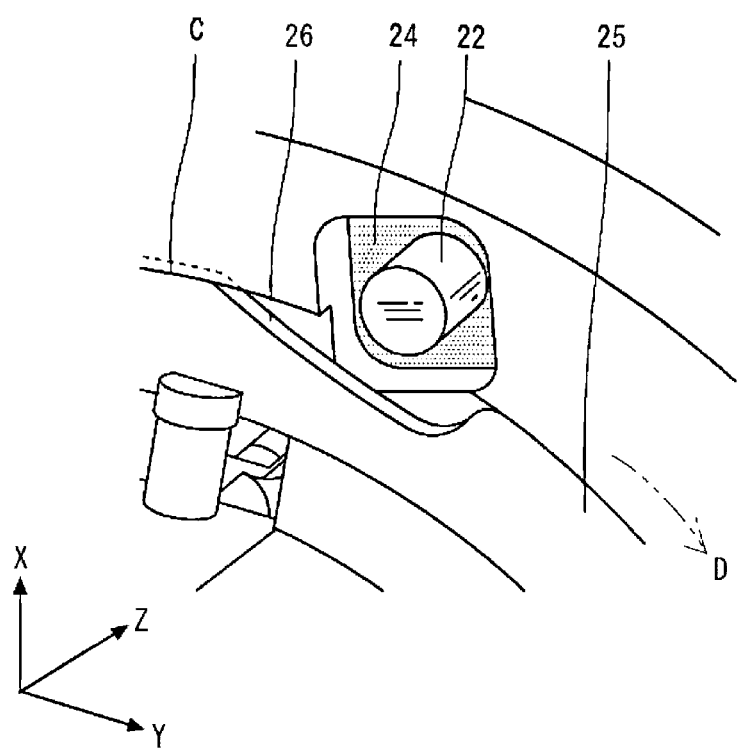
FIG. 8 is an enlarged view of a main part of a vibration-proof compensation lens unit in an unlock mode.

In an initial state, the lock ring 25 does not lock the vibration-proof compensation lens frame 11 and the lock lever 35 does not lock the focus lens frame 12. In this case, as illustrated in FIG. 8, in the vibration-proof compensation lens unit 2, the projection 22 is located near the taper portion 26 without connecting with or contacting the circumferential surface C of the lock ring 25. Thus, the projection 22 may move within the operation region 24.

Figure 9:
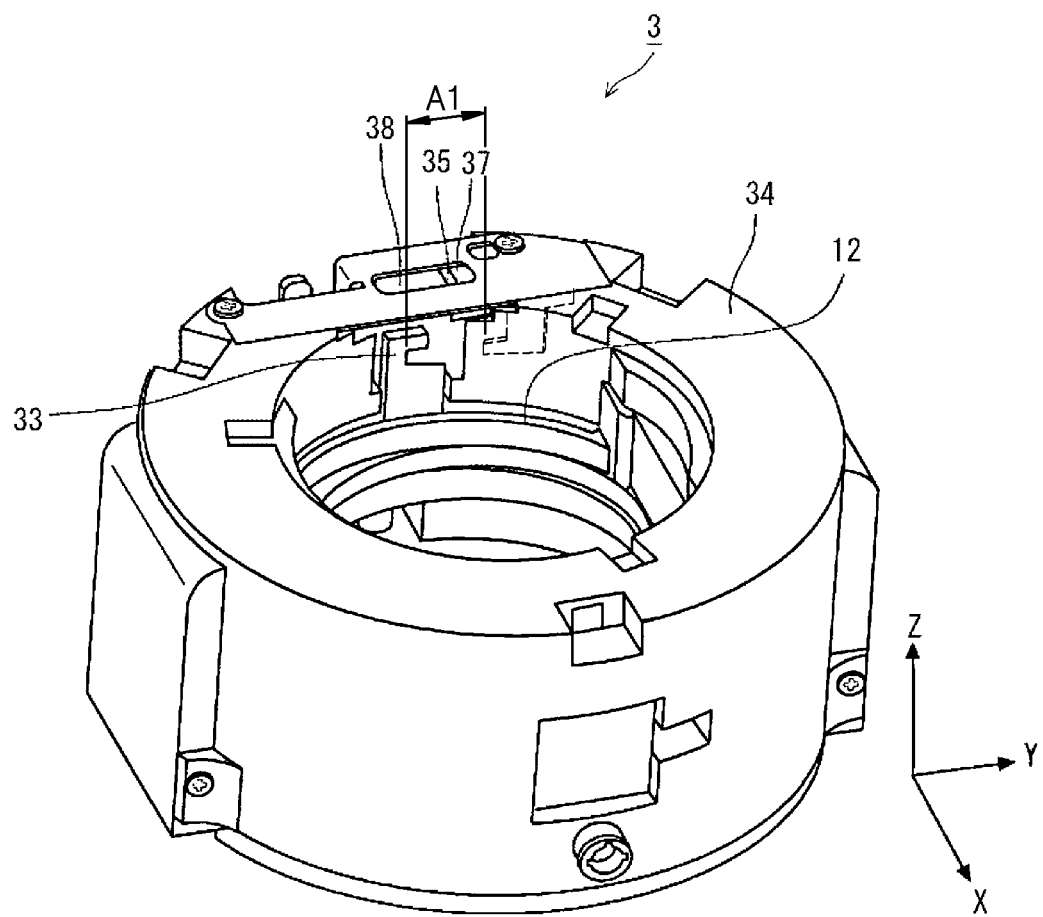
FIG. 9 is a perspective view of a focus lens unit in an unlock mode.
Figure 10:
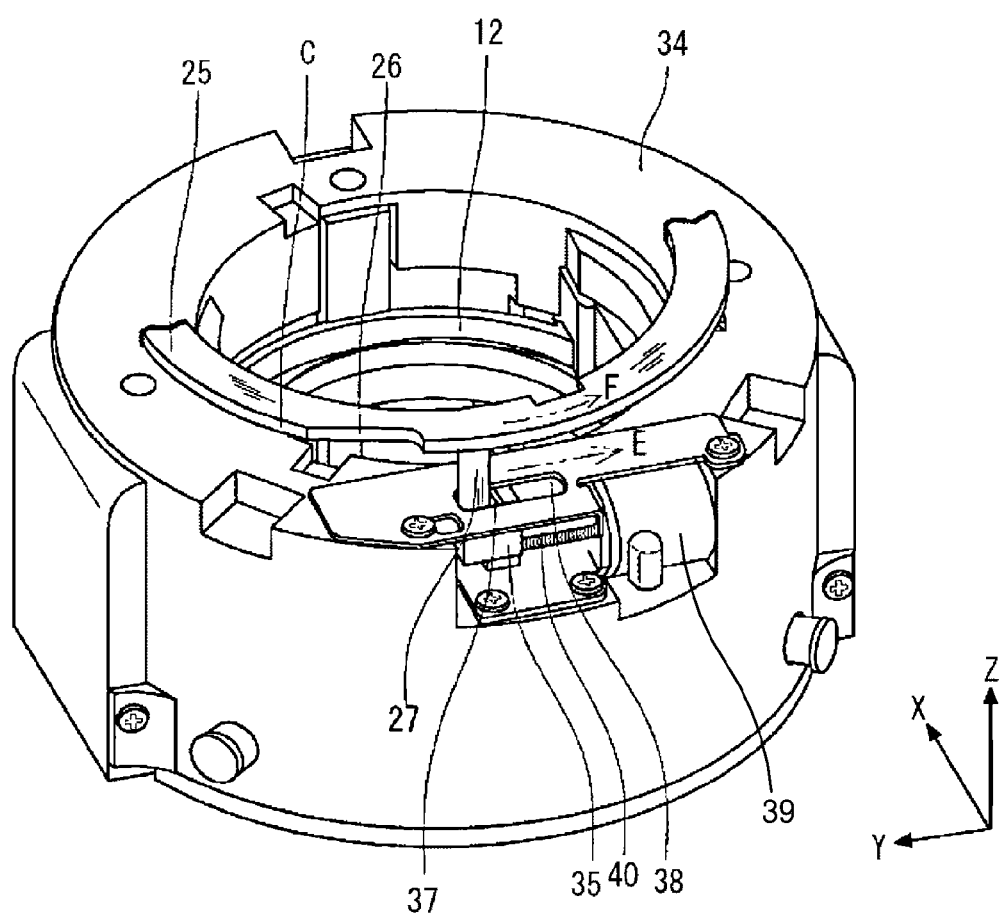
FIG. 10 is another perspective view of a focus lens unit in an unlock mode.
Figure 11:
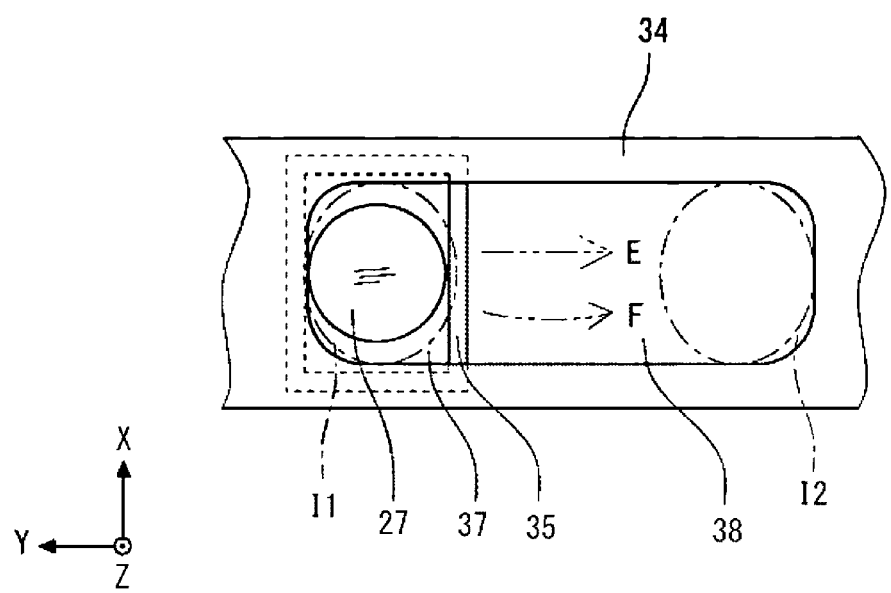
FIG. 11 is a top view of a lock pin and a groove in an unlock mode.

In this case, as illustrated in FIG. 9, the lock groove 33 and the lock projection 36 are not connected together. As illustrated in FIGS. 10 and 11, the lock pin 27 is inserted into the groove 37. The lock pin 27 may be located at a position I1 of the groove 37 (or at one end of the groove 37).

After the initial state, by performing a locking control by the control unit, the motor 39 is driven and the lock lever 35 moves along the guide shaft 40 in a direction E that is parallel to the Y axis. The lock projection 36 of the lock lever 35 moves in a direction for connection with the lock groove 33.

Since the lock lever 35 moves in the direction E, the lock pin 27 inserted into the groove 37 moves in an interlocking fashion with the lock lever 35. Since the size of the groove 37 in the X-axis direction is larger than the size of the lock pin 27 in the X-axis direction, the lock pin 27 moves from the position I1 of the groove 37 toward a position I2 thereof (or the other end of the groove 37) in a direction F along an arc-shaped path. Accordingly, the lock ring 25 rotates in a direction D (see FIG. 8) in an interlocking fashion with the lock lever 35. Since the lock ring 25 rotates in the direction D, the projection 22 relatively moves through the taper portion 26 toward the circumferential surface C with respect to the lock ring 25.

By the above control, since the motor 39 is driven, the lock ring 25 locks the vibration-proof compensation lens frame 11 and the lock lever 35 locks the focus lens frame 12.

Figure 12:
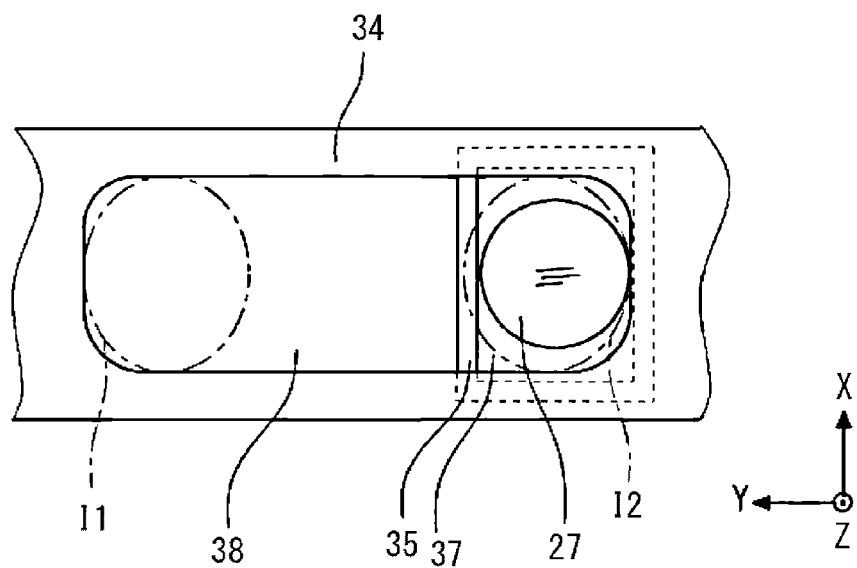
FIG. 12 is another top view of a lock pin and a groove in a lock mode.

By the driving of the motor 39, the lock lever 35 moves in the (−Y)-axis direction, and the groove 37 formed at the lock lever 35 moves from the position I1 (see FIG. 11) to the position I2 (see FIG. 12). Accordingly, as illustrated in FIG. 12, the lock pin 27 is located at the position I2 of the groove 37, and the lock projection 36 of the lock lever 35 is connected to the lock groove 33 (see FIG. 6).

Since the lock projection 36 is connected to the lock groove 33, the movement of the focus lens frame 12 with the lock groove 33 in the Z-axis direction is restricted.

Figure 13:
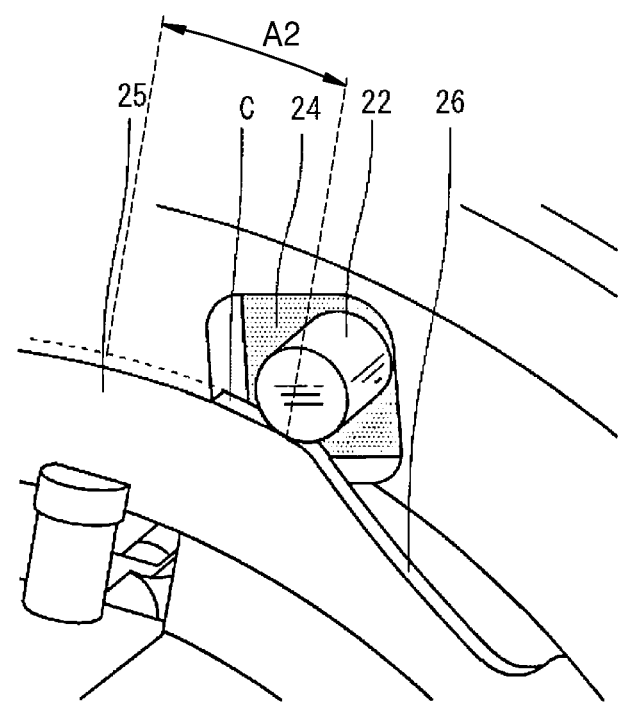
FIG. 13 is an enlarged view of a main part of a vibration-proof compensation lens unit in a lock mode.

Also, referring to FIGS. 10 and 13, according to the movement of the lock pin 27, the lock ring 25 is rotated and the projection 22 contacts the circumferential surface C of the lock ring 25. Herein, each of the three projections 22 contact the circumferential surface C of the lock ring 25, and each of the three projections 22 receives a force from contact with the circumferential surface C in a direction perpendicular to the Z axis. According to an exemplary embodiment, the directions of the forces received by the three projections 22 are different from each other by 120°. Since the three projections 22 are contacted by the vibration-proof compensation lens frame 11, even when one projection 22 is to move in the X-axis direction or the Y-axis direction, the projection 22 may not move due to the force received by the other two projections 22. Thus, the vibration-proof compensation lens frame 11 may not freely move in the X-axis direction and the Y-axis direction.

As described above, in the lens barrel 1, the lock ring 25 and the lock lever 35 are connected by the lock pin 27 and the groove 37 (the lock pin 27 and the groove 37 are collectively also referred to as the "connection portion"). Thus, when the motor 39 moves the lock lever 35, the lock ring 25 interlocks with the lock lever 35 through the lock pin 27 and the groove 37. Thus, when the motor 39 moves the lock lever 35 in the direction to connect with the focus lens frame 12, the lock ring 25 connected by the connection portion may be moved in the direction to connect with the vibration-proof compensation lens frame 11. In this way, since the vibration-proof compensation lens group L1 and the focus lens group L20 (see FIGS. 1 and 2) may be locked by using one motor 39, only one actuator is used for locking and thus the cost and complexity of providing the actuator may be reduced in comparison to the related art. Thus, the manufacturing cost of the lens barrel or the camera may also be reduced. Furthermore, since only one actuator is used for locking control, the operation of controlling the actuator for locking may be simplified.

The lock ring 25 installed substantially concentrically with the optical-axis center of the vibration-proof compensation lens frame 11 connects with or contacts the projection 22 protruding in the Z-axis (optical-axis) direction from the vibration-proof compensation lens frame 11, and the concave taper portion 26 connecting with the circumferential surface C is installed at the lock ring 25. The lock ring 25 rotates and the projection 22 moves along the taper portion 26 to connect with the circumferential surface C, thereby restricting the movement of the vibration-proof compensation lens frame 11 in the X-axis direction and the Y-axis direction (the directions perpendicular to the optical-axis direction). According to this configuration, since the lock ring 25 may be rotated to restrict the movement of the vibration-proof compensation lens frame 11 in the direction perpendicular to the optical axis, the lock ring 25 may lock the vibration-proof compensation lens group L10 in a simple fashion.

Also, the lock projection 36 connected to the lock groove 33 formed at the focus lens frame 12 is installed at the lock lever 35. Since the lock lever 35 moves in the direction to connect with the focus lens frame 12, the lock projection 36 connects to the lock groove 33 to restrict the movement of the focus lens frame 12 in the Z-axis direction. Since the lock lever 35 may move to be connected to the lock groove 33 to thereby restrict the movement of the focus lens frame 12 in the optical-axis direction, the lock lever 35 may lock the focus lens group L20 in a simple fashion.

Also, the connection portion connecting the lock ring 25 and the lock lever 35 includes the lock pin 27 installed at the lock ring 25 and the groove 37 installed at the lock lever 35. The groove 37 extends in the direction perpendicular to the movement direction of the lock lever 35, and the lock pin 27 is connected to or inserted into the groove 37. Since the lock pin 27 may be connected to the groove 37 to connect the lock ring 25 and the lock lever 35, when the actuator moves any one of the lock ring 25 and the lock lever 35, both the vibration-proof compensation lens group L10 and the focus lens group L20 may be locked in a simple fashion. Also, since the groove 37 extends in the direction perpendicular to the movement direction of the lock lever 35, when the lock lever 35 moves, the lock pin 27 may also move in the direction perpendicular to the movement direction of the lock lever 35. Accordingly, the lock ring 25 may be rotated in an interlocking fashion with the lock lever 35.

When at least one of the lock member locking the vibration-proof compensation lens group L10, the lock member locking the focus lens group L20, and the connection portion connecting the lock ring 25 and the lock lever 35 has the above configuration, a locking mechanism may be simply and easily configured. Accordingly, the lens barrel 1 may be miniaturized.

Also, a movement distance A1 (see FIG. 9) of the lock projection 36 from the initial state to the connection between the lock groove 33 and the lock projection 36 and a movement distance A2 (see FIG. 13) of the lock ring 25 from the initial state to the connection between the circumferential surface C and the projection 22 may be properly modified. Accordingly, the timing of locking the vibration-proof compensation lens frame 11 and the timing of locking the focus lens frame 12 may be adjusted.

As an example, by setting the distance A2 to be smaller than the distance A1, the lock ring 25 may restrict the movement of the vibration-proof compensation lens frame 11 in the X-axis direction and the Y-axis direction and then the lock lever 35 may restrict the movement of the focus lens frame 12 in the Z-axis direction. In this way, while the lock ring 25 restricts the movement of the vibration-proof compensation lens frame 11 in the X-axis direction and the Y-axis direction, the lock lever 35 may not restrict the movement of the focus lens frame 12 in the Z-axis direction. Accordingly, while the vibration-proof compensation lens group L10 is locked, the focus lens group L20 may be unlocked. In this state, the control unit drives the VCMs 21A and 21B to move the focus lens group L20 and controls the motor 39 not to move the lock lever 35.

Also, by setting the distance A2 to be larger than the distance A1, the lock lever 35 may restrict the movement of the focus lens frame 12 in the Z-axis direction and, as a result, the lock ring 25 may restrict the movement of the vibration-proof compensation lens frame 11 in the X-axis direction and the Y-axis direction. In this way, while the lock lever 35 restricts the movement of the focus lens frame 12 in the Z-axis direction, the lock ring 25 may not restrict the movement of the vibration-proof compensation lens frame 11 in the X-axis direction and the Y-axis direction. Accordingly, while the focus lens group L20 is locked, the vibration-proof compensation lens group L10 may be unlocked.

Also, in this state, the control unit drives the VCMs 31A and 31B to move the vibration-proof compensation lens group L10 and controls the motor 39 not to move the lock lever 35.

Before or simultaneously with the locking control, in order for the lock projection 36 to be fixed to the position for connection with the lock groove 33, the control unit drives the VCMs 31A and 31B and fixes the position of the focus lens frame 12 in the Z-axis direction. Also, in order for each projection 22 to be disposed at the center portion of each operation region 24, the control unit may control the position of the vibration-proof compensation lens frame 11 in the X-axis direction and the Y-axis direction.

In addition, in some cases, the vibration-proof compensation lens unit 2 and the focus lens unit 3 may move somewhat in the X-axis direction or the Y-axis direction. Even when the vibration-proof compensation lens unit 2 and the focus lens unit 3 move in the X-axis direction or the Y-axis direction and thus the insertion angle of the lock pin 27 inserted into the groove 37 is changed, the lock pin 27 and the groove 37 may be connected by, for example, a universal joint structure or some other connection member or fastener so that the lock pin 27 and the groove 37 may always be connected together.

Exemplary Embodiment 2

Figure 14:
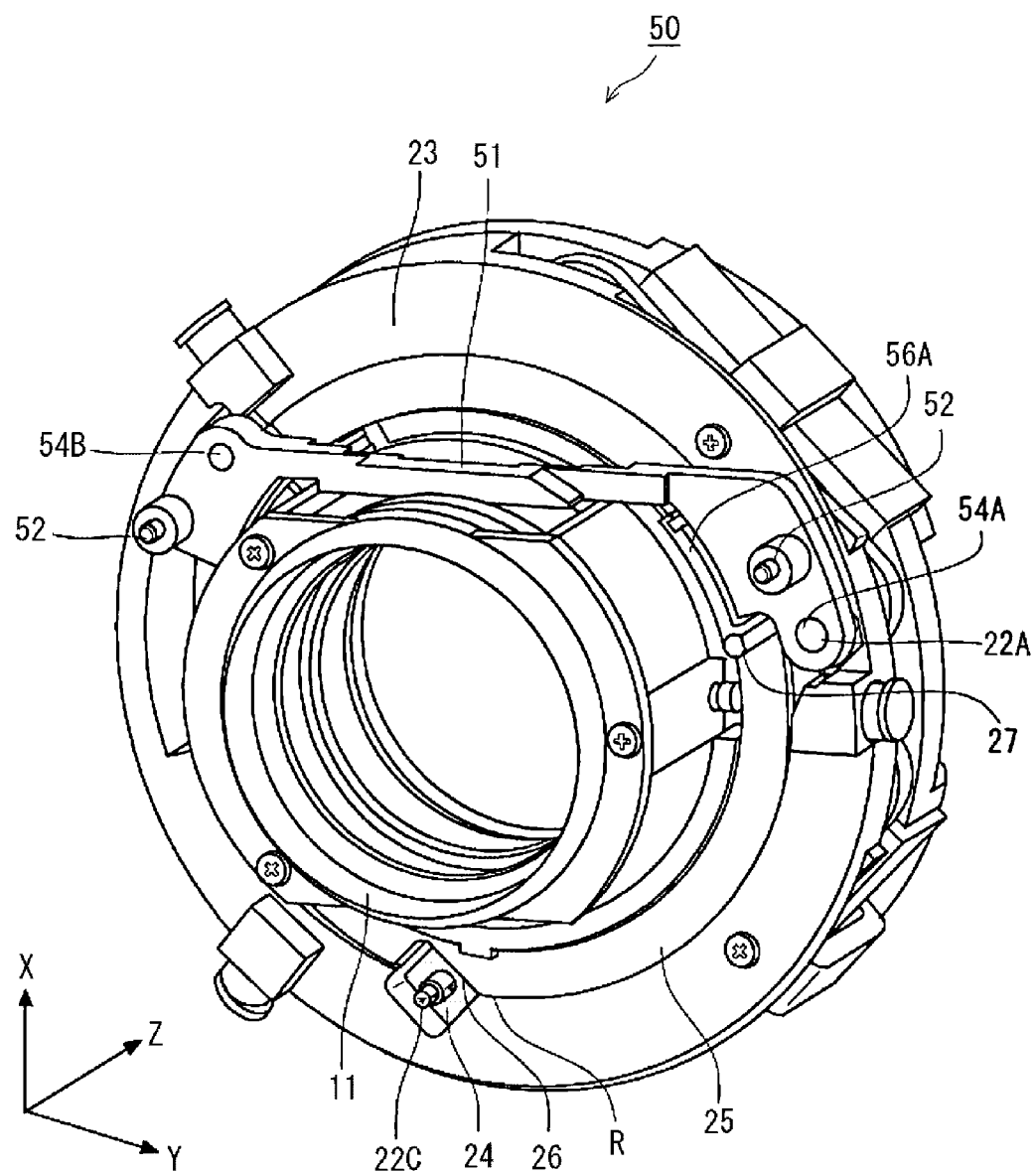
FIG. 14 is a perspective view of a vibration-proof compensation lens unit according to Exemplary Embodiment 2.

Hereinafter, Exemplary Embodiment 2 will be described with reference to the drawings. As illustrated in FIG. 14, a vibration-proof compensation lens unit 50 further includes a stopper 51 in comparison with the vibration-proof compensation lens unit 2 (see FIG. 3).

Figure 15:
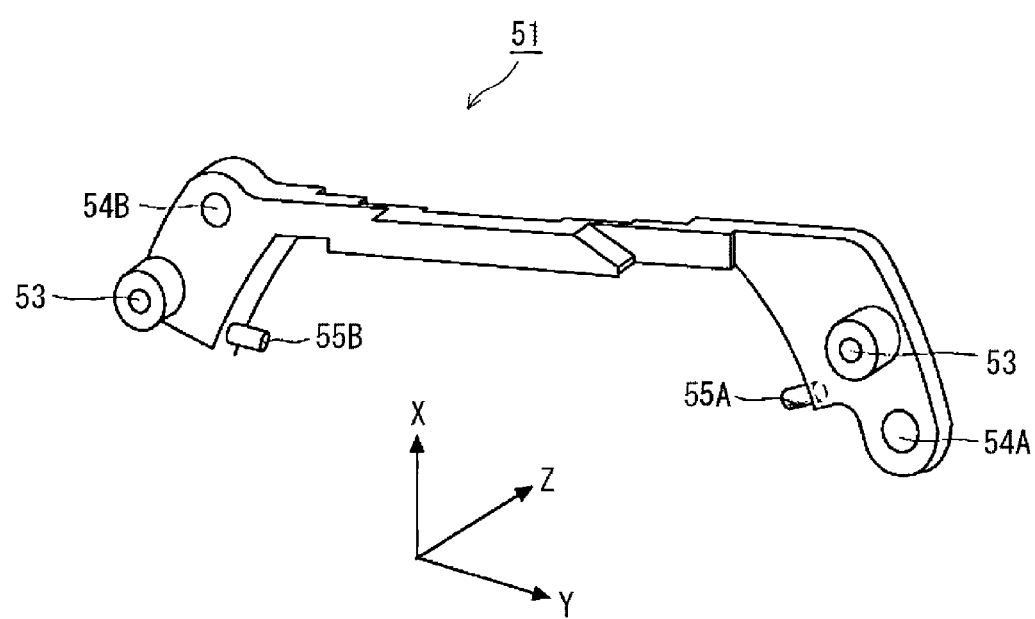
FIG. 15 is a perspective view of a stopper.
Figure 16:
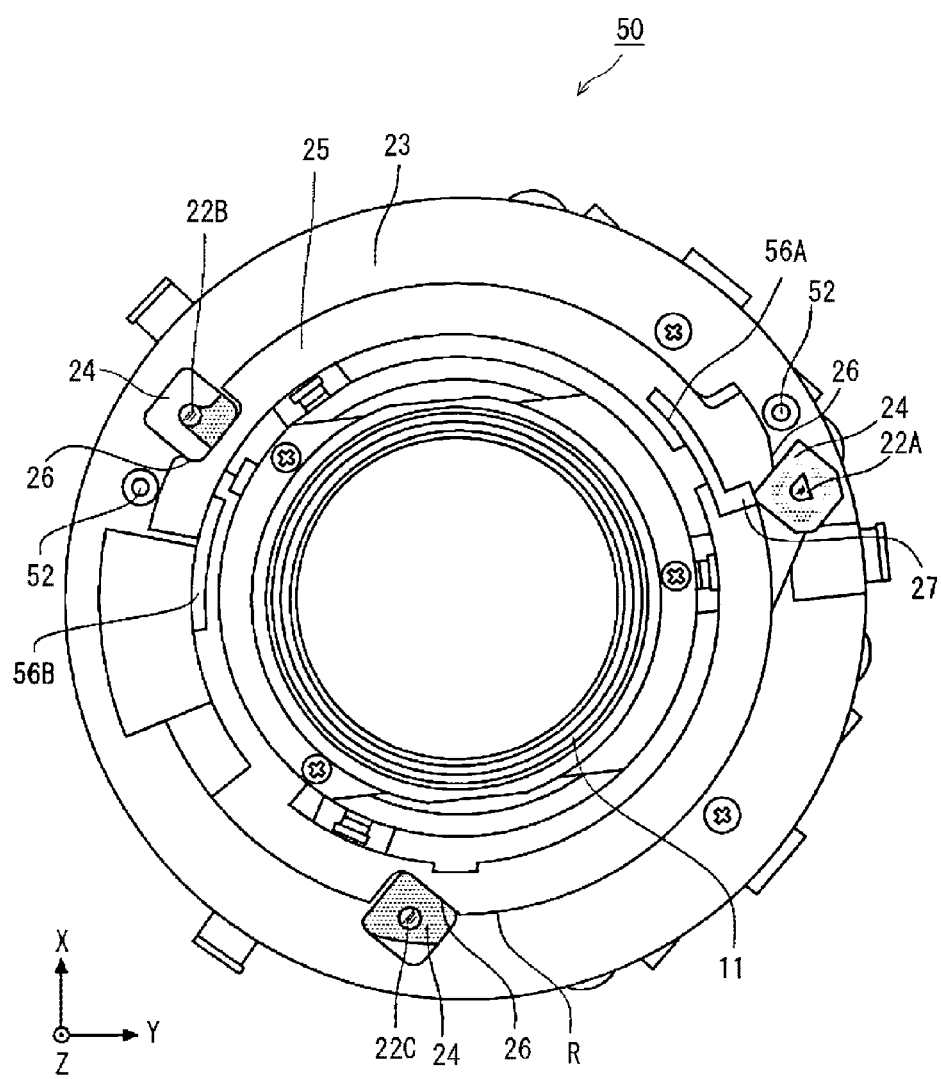
FIG. 16 is a front view of a vibration-proof compensation lens unit with a stopper removed therefrom.

Referring to FIGS. 14 to 16, in the vibration-proof compensation lens unit 50, a guide shaft 52 protruding in the (−Z)-axis direction is disposed at the surface 23 facing the focus lens unit 3.

A guide hole 53 fitted to the guide shaft 52 is disposed at the stopper 51. The stopper 51A may move in the Z-axis direction through the guide hole 53 fitted to the guide shaft 52. Also, two guide shafts 52 and two guide holes 53 are installed.

In the stopper 51, fit slots 54A and 54B are disposed respectively at positions corresponding to projections 22A and 22B. When the stopper 51 is moved in the Z-axis direction, the projection 22A is inserted into the fit slot 54A and the projection 22B is inserted into the fit slot 54B.

Figure 17:
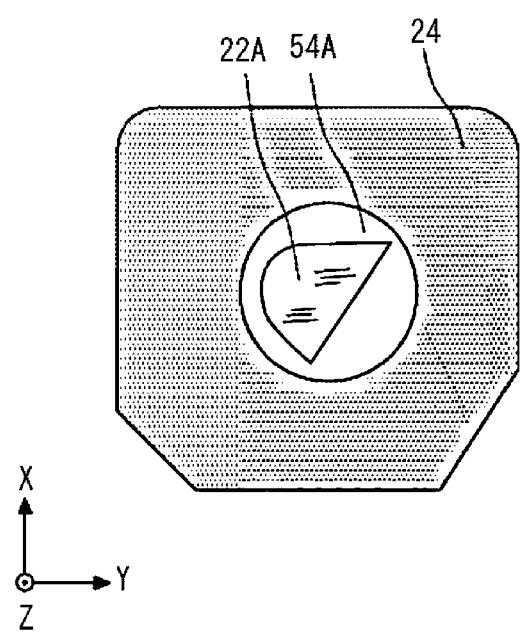
FIG. 17 is a top view of a fit slot, a projection, and an operation region.

As in Exemplary Embodiment 1, on the surface 23, three projections 22A, 22B, and 22C are installed at the positions of the vertexes of a regular triangle. However, it is understood that more or less than three projections may be used according to exemplary embodiments. As illustrated in FIG. 17, the size of the fit slot 54A is larger than the size of the projection 22A and is smaller than the size of the operation region 24. Also, the size of the fit slot 54B is larger than the size of the projection 22B and is smaller than the size of the operation region 24.

As illustrated in FIG. 15, follow pins 55A and 55B for movement in the Z-axis direction are installed at the stopper 51.

As illustrated in FIGS. 14 and 16, guide portions 56A and 56B for moving the stopper 51 in the Z-axis direction are installed at the lock ring 25. The guide portions 56A and 56B may be installed respectively at the positions corresponding to the projections 22A and 22B, but are not limited thereto. The guide portions 56A and 56B may be installed respectively at the positions corresponding to the follow pins 55A and 55B.

Figure 18:
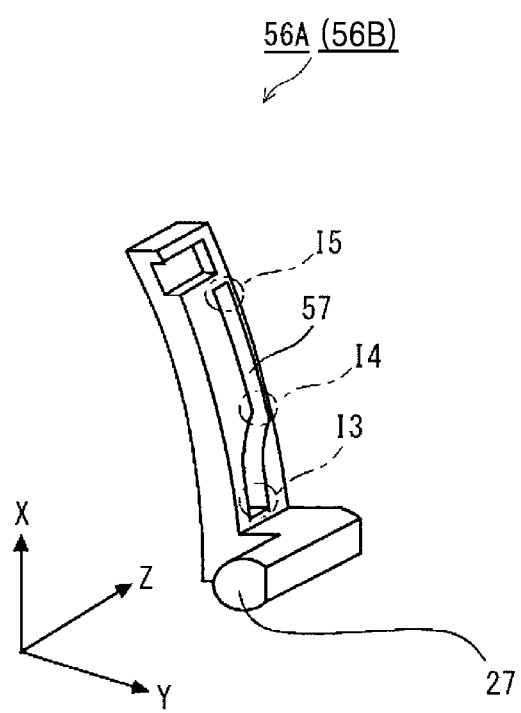
FIG. 18 is a perspective view of a guide portion.

As illustrated in FIG. 18, a cam groove 57 extending in the circumferential direction of the lock ring 25 is installed at the guide portion 56A. For example, the cam groove 57 may extend obliquely in the circumferential direction of the lock ring 25.

When the follow pins 55A and 55B are inserted into the cam groove 57 and follow the cam groove 57, the stopper 51 may move in the Z-axis direction. The cam groove 57 may include a first position I3, a second position I4, and a third position I5. When the follow pins 55A and 55B are located at the first position I3 of the cam groove 57, the fit slots 54A and 54B are spaced apart from the projections 22A and 22B in the Z-axis direction. When the follow pins 55A and 55B are located at the second position I4 of the cam groove 57, the fit slots 54A and 54B are located nearer to the projections 22A and 22B in the Z-axis direction. The positions of the fit slots 54A and 54B in the Z-axis direction in the case when the follow pins 55A and 55B are located at the third position I5 of the cam groove 57 may be the same as the positions of the fit slots 54A and 54B in the Z-axis direction in the case when the follow pins 55A and 55B are located at the second position I4 of the cam groove 57. When the follow pins 55A and 55B are located at the second position I4 of the cam groove 57, the projections 22A and 22B may be inserted into the fit slots 54A and 54B of the stopper 51. Also, the lock pin 27 is installed near the guide portion 56A.

Also, similar to the cam groove 57 installed at the guide portion 56A, a cam groove 57 to be followed by the follow pin 55B is installed at the guide portion 56B. The cam groove 57 installed at the guide portion 56B may also include a first position I3, a second position I4, and a third position I5.

A process will be described below in which, when the lock ring 25 is rotated to lock the vibration-proof compensation lens frame 11, since the stopper 51 is interlocked, the fit slot 54A moves in the (+Z)-axis direction to be fitted to the projection 22A. Also, since a process of locking the focus lens frame 12 by the lock lever 35 is the same process as the process described in connection with Exemplary Embodiment 1, redundant descriptions thereof will be omitted for conciseness.

Figure 19:
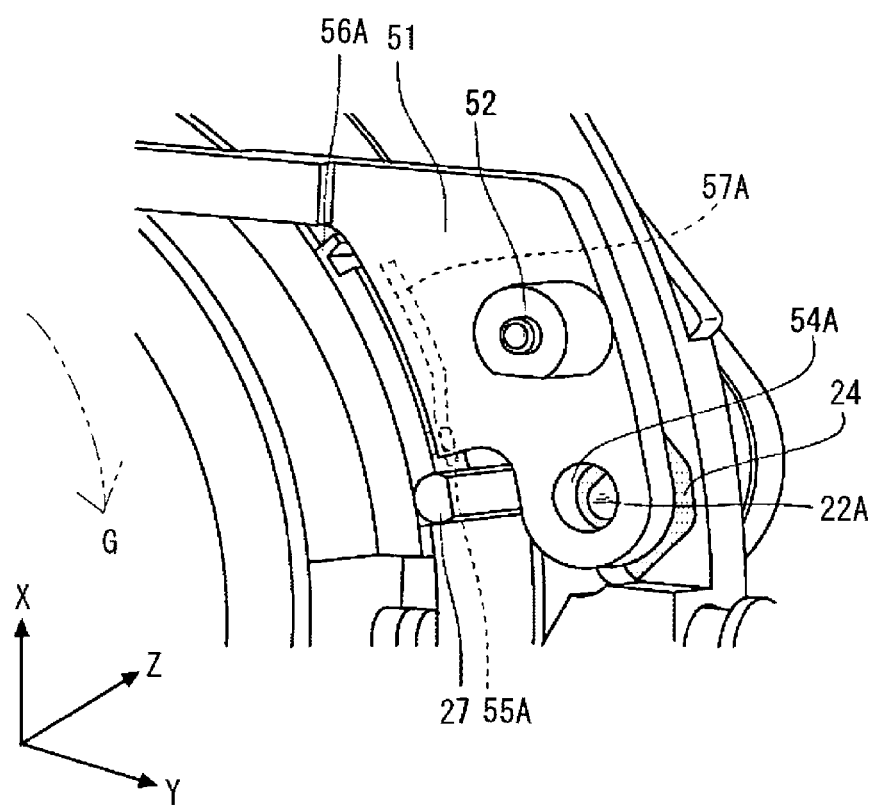
FIG. 19 is an enlarged view of a main part of a vibration-proof compensation lens unit in an unlock mode.
Figure 20:
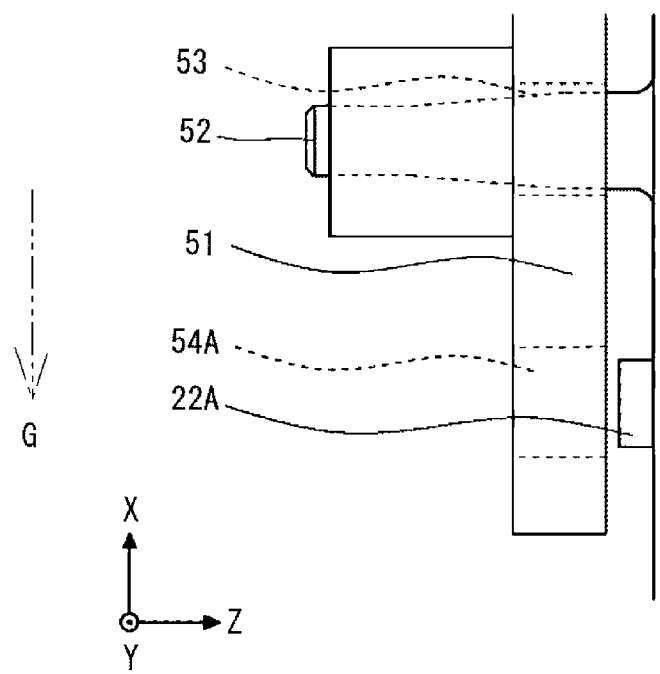
FIG. 20 is a side view of a main part of a vibration-proof compensation lens unit in an unlock mode.
Figure 21:
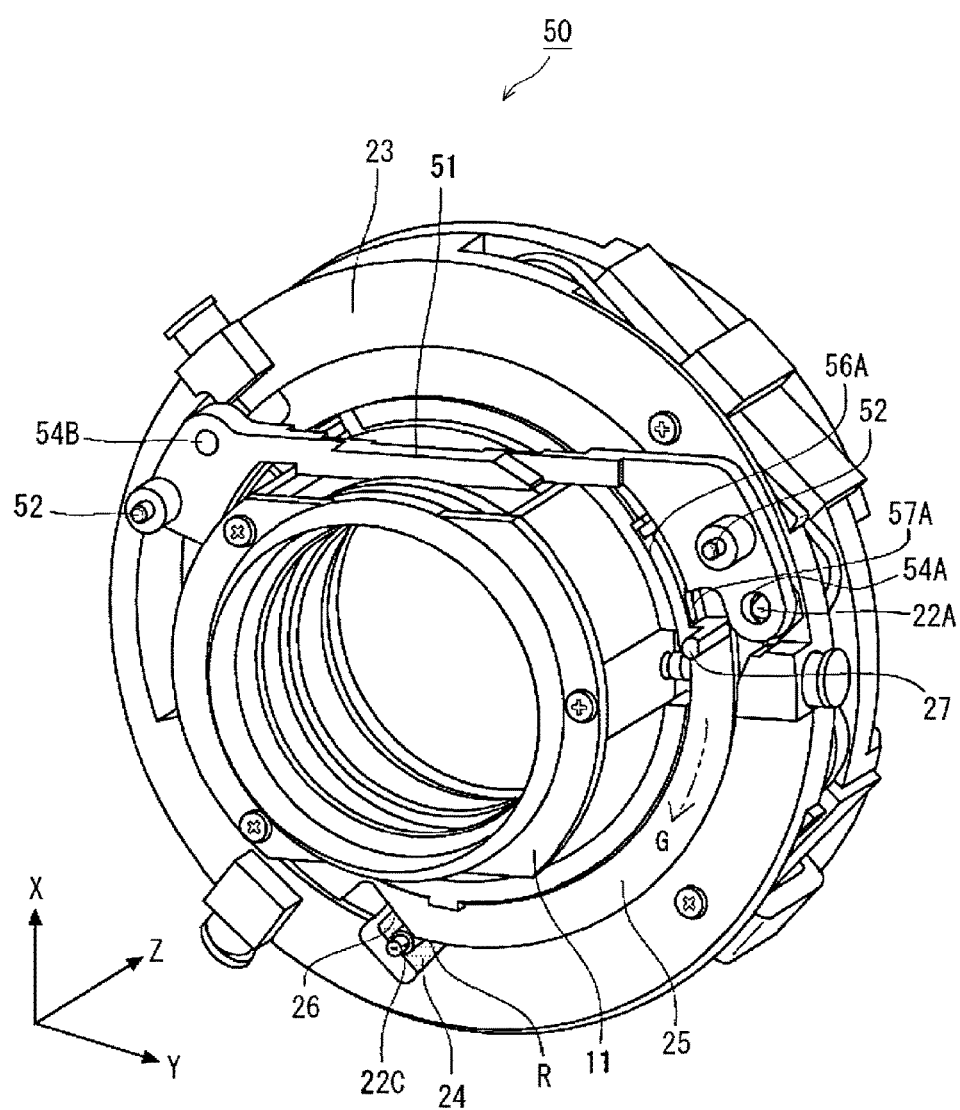
FIG. 21 is a perspective view of a vibration-proof compensation lens unit in a lock process.

In an initial state, the lock ring 25 does not lock the vibration-proof compensation lens frame 11. In this case, as illustrated in FIGS. 19 and 20, since the stopper 51 is spaced apart from the projection 22A in the Z-axis direction, the fit slot 54A is not fitted to the projection 22A. Also, the follow pin 55A is located at the first position I3 (see FIG. 18) of the cam groove 57.

After the initial state, by performing a locking control by the control unit, the motor 39 is driven and the lock lever 35 moves. Accordingly, the lock ring 25 also rotates in a direction G in an interlocking fashion with the lock lever 35. The detailed structures and operations thereof are the same as those in Exemplary Embodiment 1.

When the lock ring 25 rotates in the direction G, since the guide portion 56A also rotates in the direction G, the follow pin 55A inserted into the guide portion 56A follows the cam groove 57 and moves from the first position I3 toward the second position I4 (see FIG. 18). Accordingly, the stopper 51 with the follow pin 55A moves in the (+Z)-axis direction. That is, since the stopper 51 moves toward the projection 22A in the Z-axis direction, the fit slot 54A is fitted to the projection 22A.

Likewise, since the guide portion 56B also moves in the direction G, the follow pin 55B follows the cam groove 57 and moves from the first position I3 toward the second position I4. Accordingly, the stopper 51 moves in the (+Z)-axis direction and the fit slot 54B is fitted to the projection 22B.

As described above, when the follow pins 55A and 55B reach the second position I4, the lock pin 27 further rotates in the direction G (see FIG. 19) in an interlocking fashion with the lock lever 35.

Since the lock ring 25 rotates further by the lock pin 27, three projections 22A to 22C and the lock ring 25 are moved in relation to each other. The three projections 22A to 22C contact an outer peripheral portion R.

Figure 22:
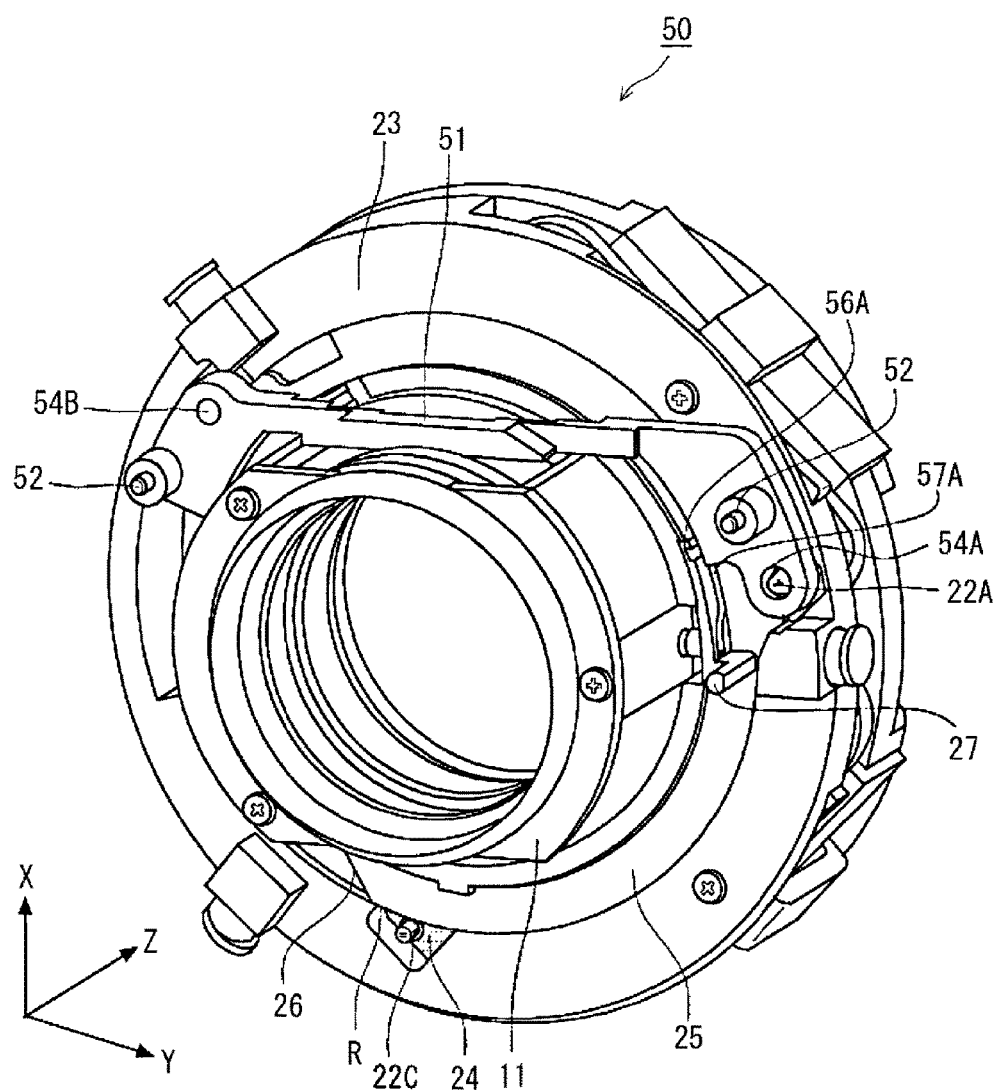
FIG. 22 is another perspective view of a vibration-proof compensation lens unit in a lock mode.
Figure 23:
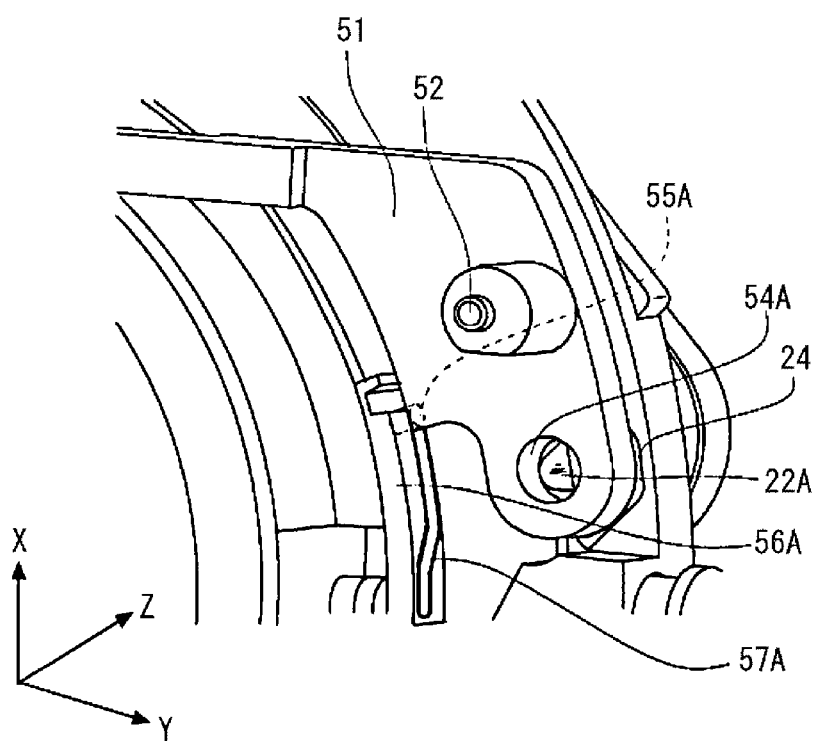
FIG. 23 is an enlarged view of a main part of a vibration-proof compensation lens unit in a lock mode.
Figure 24:
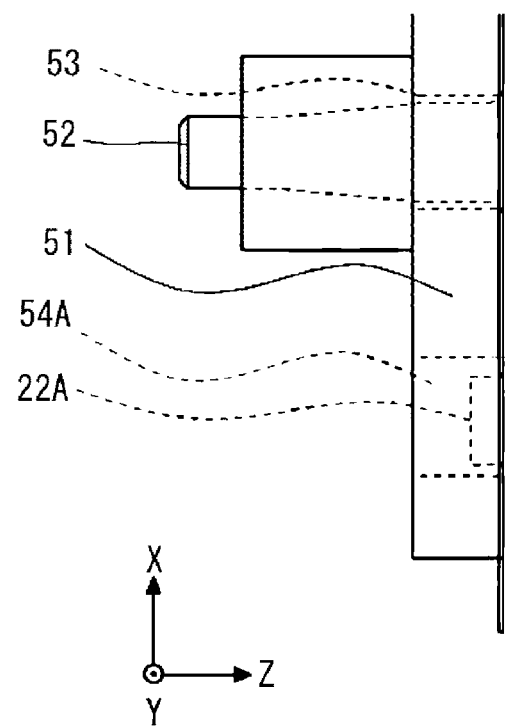
FIG. 24 is a side view of a main part of a vibration-proof compensation lens unit in a lock mode.

As the lock ring 25 rotates further, the follow pins 55A and 55B reach the third position I5. In this case, as illustrated in FIGS. 22 to 24, the stopper 51 is located nearer to the projection 22 in the Z-axis direction, and the fit slots 54A and 54B are fitted to the projections 22A and 22B.

As described above, the stopper 51 is interlocked with the rotation of the lock ring 25 and thus the fit slots 54A and 54B move in (+Z)-axis direction to be fitted to the projections 22A and 22B, to thereby restrict the movement of the vibration-proof compensation lens frame 11 in the X-axis direction and the Y-axis direction (i.e., the directions perpendicular to the optical axis). In this way, the stopper 51 may more securely lock the vibration-proof compensation lens group L10 (see FIGS. 1 and 2).

By adjusting the distance from the first position I3 to the second position I4 (see FIG. 18) of the cam groove 57, after the fit slots 54A and 54B are fitted to the projections 22A and 22B, the projections 22A and 22B may contact the outer peripheral portion R of the lock ring 25. In this way, before the projections 22A and 22B are locked by the lock ring 25, the fit slots 54A and 54B may determine the positions of the projections 22A and 22B in the X-axis direction and the Y-axis direction. Thus, the position of the vibration-proof compensation lens group L10 in a lock mode may be determined with high accuracy.

The cam groove 57 extending in the circumferential direction is installed at the lock ring 25, and the follow pins 55A and 55B following the cam groove 57 are installed at the stopper 51. The lock ring 25 rotates and thus the follow pins 55A and 55B move in the Z-axis direction (the optical-axis direction) along the cam groove 57. Since the cam groove 57 may be followed by the follow pins 55A and 55B to restrict the movement of the vibration-proof compensation lens group L10 in the direction perpendicular to the optical axis, the stopper 51 may more simply and securely lock the vibration-proof compensation lens group L10.

Exemplary Embodiments 1 and 2 described above may be combined in many different ways that would be understood by an artisan having ordinary skill in the art. Also, the exemplary embodiments are not limited to the above exemplary embodiments and may be modified without departing from the spirit and scope of the exemplary embodiments. For example, the motor 39 may rotate the lock ring 25 instead of moving the lock lever 35. Also, instead of the motor 39, another actuator may be used as a driving source for the lock ring 25 or the lock lever 35. The lock pin 27 may be installed at the lock lever 35 instead of at the lock ring 25, and the groove 37 may be installed at the lock ring 25 instead of at the lock lever 35. Also, the number of projections 22 installed at the vibration-proof compensation lens frame 11 is not limited to 3. Also, the number of projections 22 fitted to the fit slot 54 of the stopper 51 is not limited to 2.

Furthermore, instead of the VCMs 21A and 21B, an ultrasonic motor may be used to move the vibration-proof compensation lens frame 11. The ultrasonic motor has a self holding force which may be incapable of fixing the vibration-proof compensation lens frame 11 in the X-axis direction and the Y-axis direction when powered off by a control operation. For example, the self holding force when powered off may be less than three times of the weight of the vibration-proof compensation lens frame 11. Instead of the VCMs 31A and 31B, the same ultrasonic motor may be used to move the focus lens frame 12.

Exemplary Embodiment 3

Hereinafter, Exemplary Embodiment 3 will be described with reference to the drawings. Exemplary Embodiments 1 and 2 represent a structure capable of locking the vibration-proof compensation lens unit 2 and the focus lens unit 3 by using one motor (e.g., actuator) 39 for driving the lock lever 35 of the focus lens unit 3 as a power source thereof. The present exemplary embodiment provides a structure capable of locking the vibration-proof compensation lens unit 2 and the focus lens unit 3 by using one motor (actuator) 29 for driving the lock ring 25 of the vibration-proof compensation lens unit 2 as a power source thereof.

Figure 25:
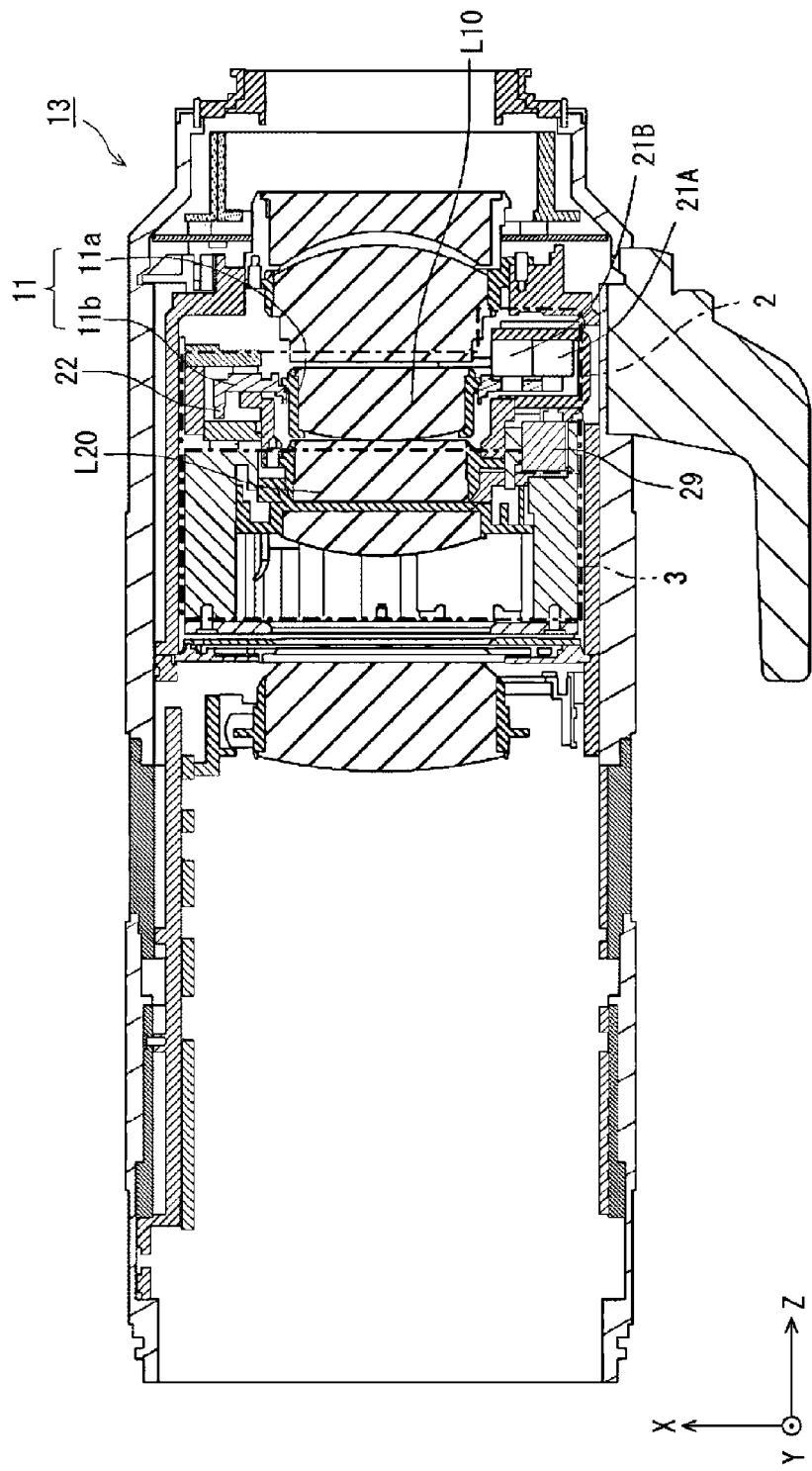
FIG. 25 is a cross-sectional view illustrating a lens barrel according to Exemplary Embodiment 3.

FIG. 25 is a cross-sectional view illustrating a lens barrel 13 according to Exemplary Embodiment 3. As illustrated in FIG. 25, for example, the lens barrel 13 has the shape of a cylinder. A center axis of the cylinder corresponds to the optical axis. As in Exemplary Embodiments 1 and 2, the Z-axis direction corresponds to the optical-axis direction, and the (+Z)-axis direction corresponds to the direction identical to the light incidence direction. The (−Z)-axis direction corresponds to the reverse direction of the (+Z)-axis direction. The X-axis direction corresponds to one direction in the plane perpendicular to the Z-axis direction, and the Y-axis direction corresponds to the direction perpendicular to the X-axis direction and the Z-axis direction.

In the present exemplary embodiment, the lens barrel 13 includes a vibration-proof compensation lens unit 2 and a focus lens unit 3. The vibration-proof compensation lens unit 2 is adjacent to the focus lens unit 3 and is located at the (+Z)-axis side in comparison with the focus lens unit 3. In the drawings, only some components of the vibration-proof compensation lens unit 2 and the focus lens unit 3 are illustrated, and the other components are not illustrated.

Figure 26:
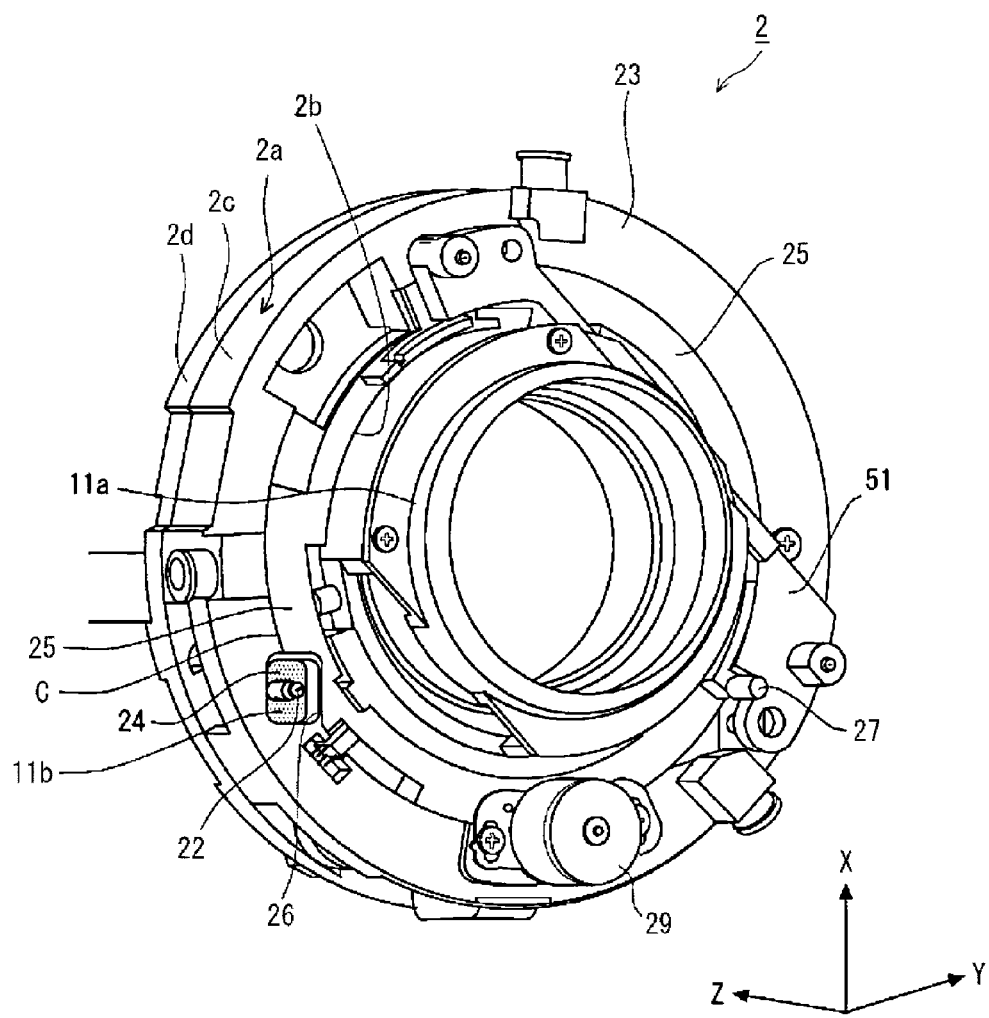
FIG. 26 is a perspective view illustrating a vibration-proof compensation lens unit according to Exemplary Embodiment 3.

FIG. 26 is a perspective view illustrating a vibration-proof compensation lens unit 2 according to Exemplary Embodiment 3. As illustrated in FIGS. 25 and 26, the vibration-proof compensation lens unit 2 includes a main body 2a, a vibration-proof compensation lens group L10, a vibration-proof compensation lens frame 11, VCMs 21A and 21B, and a lock ring 25. This configuration is the same as the configuration in Exemplary Embodiments 1 and 2. In the present exemplary embodiment, a motor (actuator) 29 is further included in addition thereto.

The main body 2a of the vibration-proof compensation lens unit 2 has a ring shape, and an opening 2b is formed at a center thereof around the optical axis. The main body 2a has a structure in which an upper cover 2c and a lower cover 2d are connected at an outer periphery thereof. A gap is formed between the upper cover 2c and the lower cover 2d. A hole serving as an operation region 24 is formed at a surface 23 of the upper cover 2c facing the focus lens unit 3. Three operation regions 24 are formed at three places in the surface 23. The three operation regions 24 are disposed to correspond to the vertexes of a regular triangle around the optical axis.

In the main body 2a, the lock ring 25 is installed to surround the opening 2b. The lock ring 25 is installed at an inner side in comparison with the three operation regions 24. Three taper portions 26 are formed at the circumferential surface C of the outer periphery of the lock ring 25. When the vibration-proof compensation lens frame 11 is in an operation state, the taper portion 26 is located in the operation region 24. A lock pin 27 protruding in the (−Z)-axis direction is formed at the lock ring 25.

In the present exemplary embodiment, the motor (actuator) 29 is installed at the main body 2a. The motor 29 may be, for example, a step motor, although is not limited thereto. The motor 29 functions as an actuator for driving the lock ring 25. The motor 29 rotates the lock ring 25 on the optical axis.

The vibration-proof compensation lens frame 11 includes a cylinder portion 11a and a flange portion 11b surrounding the outer peripheral surface of the cylinder portion 11a. The vibration-proof compensation lens frame 11 supports the vibration-proof compensation lens group L10 in the cylinder portion 11a. The optical axis of the vibration-proof compensation lens group L10 corresponds to the optical axis of the lens barrel 13. A projection 22 is installed on the surface of the flange portion 11b at the (−Z)-axis side. Three projections 22 are installed at three positions corresponding to the vertexes of a regular triangle around the optical axis. The flange portion 11b is inserted between the upper cover 2c and the lower cover 2d of the main body 2a. The cylinder portion 11a of the vibration-proof compensation lens frame 11 is disposed in the opening 2b of the main body 2a. The three projections 22 protrude from the operation region 24 disposed at the surface 23 of the upper cover 2c of the main body 2a. Accordingly, the vibration-proof compensation lens frame 11 may operate within the range of restricting the projection 22 in the operation region 24.

The VCMs 21A and 21B are fixed to, for example, the lower cover 2d of the main body 2a. The VCMs 21A and 21B correspond to an actuator for driving the vibration-proof compensation lens frame 11. For example, the VCMs 21A and 21B drive the vibration-proof compensation lens frame 11 in order to eliminate the influence of a vibration applied to the lens barrel 13. The VCMs 21A and 21B have an excellent response time. However, the VCMs 21A and 21B may not fixedly support the vibration-proof compensation lens frame 11 when no electrical signal is applied thereto. When the VCMs 21A and 21B are used for a high-performance large-diameter lens, it may be necessary to use a component to prevent noise or damage caused by a collision of the vibration-proof compensation lens frame 11 with other components when no electrical signal is applied to the VCMs 21A and 21B.

According to an exemplary embodiment, by using the motor 29, the lock ring 25 is rotated, and the projection 22 of the vibration-proof compensation lens frame 11 is brought into contact with the circumferential surface C of the lock ring 25. Accordingly, even when no electrical signal is applied to the VCMs 21A and 21B, the vibration-proof compensation lens frame 11 is locked by the lock ring 25.

Other driving units, for example, ultrasonic motors, may be used instead of the VCMs 21A and 21B. Also, as in Exemplary Embodiment 2, the vibration-proof compensation lens unit 2 may include a stopper 51. Since the configuration and operation of the stopper 51 are the same as the configuration and operation of the stopper in Exemplary Embodiment 2, redundant descriptions thereof will be omitted for conciseness.

Figure 27:
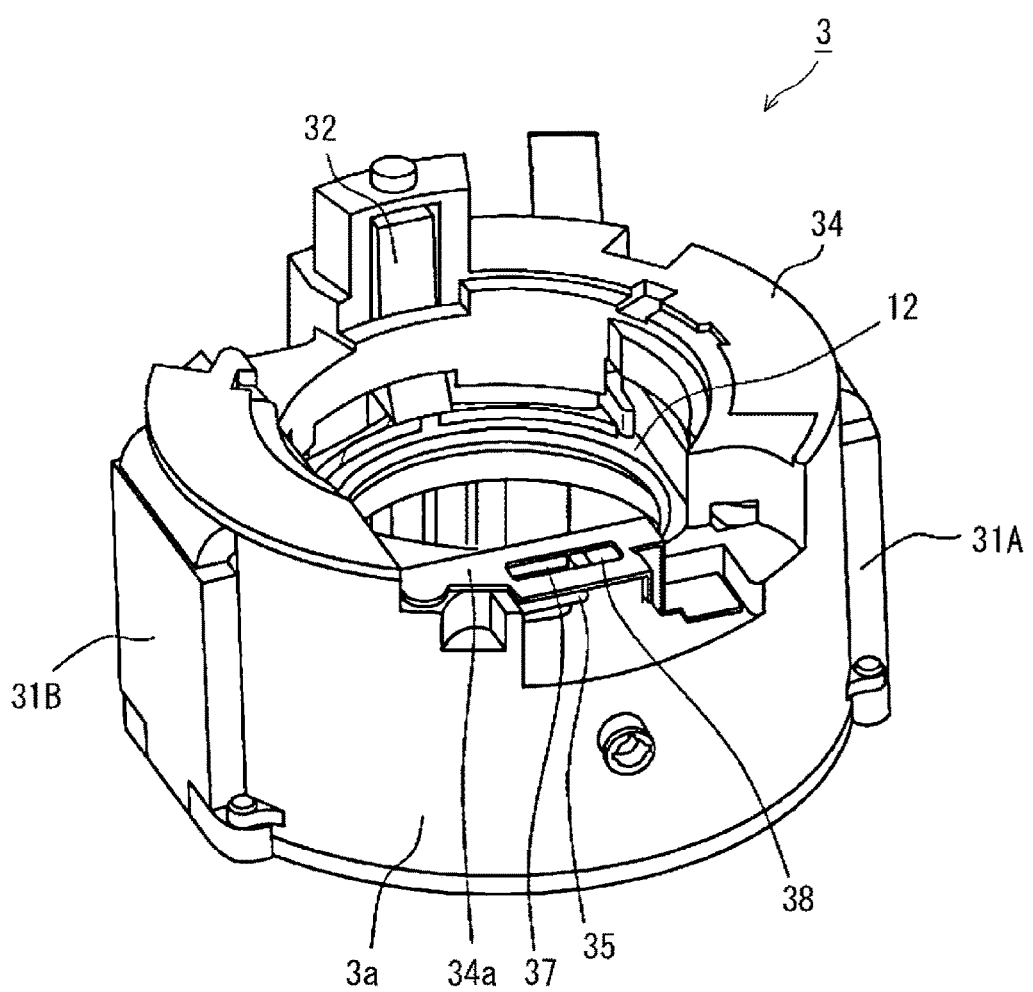
FIG. 27 is a perspective view illustrating a focus lens unit according to Exemplary Embodiment 3.
Figure 28:
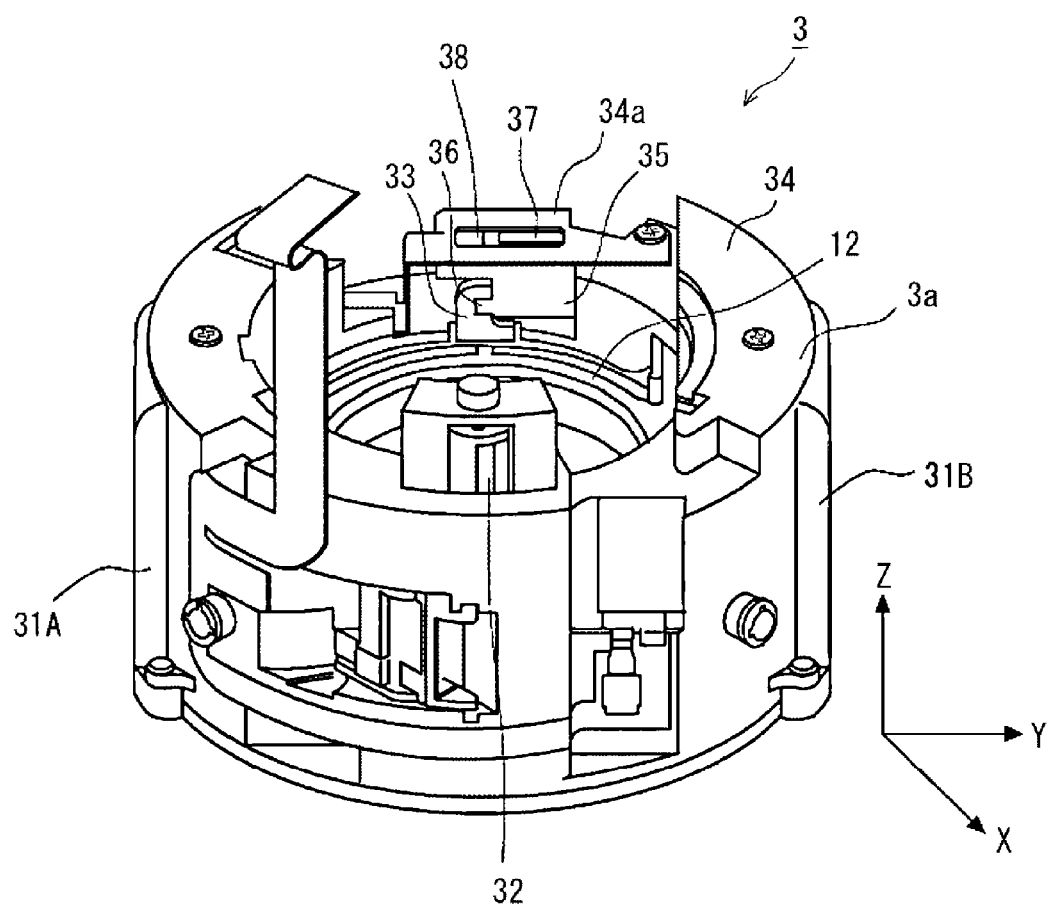
FIG. 28 is another perspective view illustrating a focus lens unit according to Exemplary Embodiment 3.

FIGS. 27 and 28 are perspective views illustrating a focus lens unit 3 according to Exemplary Embodiment 3. As illustrated in FIGS. 27 and 28, the focus lens unit 3 includes a main body 3a, a focus lens frame 12, a focus lens group, a lock lever 35, and VCMs 31A and 31B. Unlike in Exemplary Embodiments 1 and 2, in the present exemplary embodiment, a motor 39 is not installed at the focus lens unit 3.

The main body 3a of the focus lens unit 3 has a cylinder shape. A cylindrical cavity communicating in the Z-axis direction is formed in the main body 3a. A guide shaft 32 extending in the Z-axis direction is installed at an inner peripheral surface of the cavity. A notch is formed at a portion of the circumference of the main body 3a in the (+Z)-axis direction. A bridge 34a is installed across the notch. A slot 38 is formed at the bridge 34a. The slot 38 extends, for example, in the Y-axis direction.

The focus lens frame 12 has a ring shape. The focus lens frame 12 supports the focus lens group in the ring shape. The optical axis of the focus lens group corresponds to the optical axis of the lens barrel 13. The focus lens frame 12 is inserted into the cavity of the main body 3a. The focus lens frame 12 is driven in the Z-axis direction along the guide shaft 32. A lock groove 33 is installed at the focus lens frame 12. The lock groove 33 is located near the slot 38. According to an exemplary embodiment, the lock groove 33 has a U shape which is rotated on its side (also referred to as a "laid-U shape"), although exemplary embodiments are not limited thereto.

The lock lever 35 has a laid-U shape. An upper portion of the lock lever 35 is inserted into the slot 38. The lock lever 35 may be disposed to move in the Y-axis direction along the slot 38. For example, the upper portion of the lock lever 35 may be slidably inserted into the slot 38. A lower portion of the lock lever 35 includes a lock projection 36. The lock projection 36 faces the lock groove 33. When the lock lever 35 moves in the Y-axis direction, the lock projection 36 of the lock lever 35 is connected to the lock groove 33. Accordingly, the movement of the focus lens frame 12 in the Z-axis direction may be restricted. In this manner, the lock lever 35 moves in the direction for connection with the focus lens frame 12 to restrict the movement of the focus lens frame 12. When the lock lever 35 moves in the reverse direction from the connected state, the connection between the lock groove 33 and the lock projection 36 of the lock lever 35 is released. Accordingly, the locking of the focus lens frame 12 is released. A groove 37 is formed at a surface of the portion of the lock lever 35 inserted into the slot 38.

The VCMs 31A and 31B are disposed, for example, at a side surface of the main body 3a, although are not limited to being at the side surface of the main body 3a, and may also be disposed at other positions relative to the main body 3a, e.g., a bottom side or a top side of the main body 3a. The VCMs 31A and 31B function as an actuator for driving the focus lens frame 12. For example, the VCMs 31A and 31B drive the focus lens frame 12 in the Z-axis direction in order to focus an image of a subject. The VCMs 31A and 31B may implement both the high speed feature and the voiceless sound (or low noise) feature in an operation mode thereof. However, the VCMs 31A and 31B may not fixedly support the focus lens frame 12 when no electrical signal is applied thereto. When the VCMs 31A and 31B are used for a high-performance large-diameter lens, it may be necessary to prevent noise or damage caused by collision of the focus lens frame 12 with other components when no electrical signal is applied to the VCMs 31A and 31B.

According to an exemplary embodiment, the lock lever 35 is installed to lock the focus lens frame 12. Accordingly, even when no electrical signal is applied to the VCMs 31A and 31B, the focus lens frame 12 is locked by the lock ring 25. Other driving units, for example, ultrasonic motors, may be used instead of the VCMs 31A and 31B.

A process of locking the vibration-proof compensation lens frame 11 by the lock ring 25 and locking the focus lens frame 12 by the lock lever 35 will be described below. In the present exemplary embodiment, the driving operation is performed by the motor 29 installed in the vibration-proof compensation lens unit 2.

Similar to the Exemplary Embodiments 1 and 2, in an initial state, the lock ring 25 does not lock the vibration-proof compensation lens frame 11 and the lock lever 35 does not lock the focus lens frame 12.

The lock pin 27 formed at the lock ring 25 of the vibration-proof compensation lens unit 2 is inserted into the groove 37 formed at the lock lever 35 of the focus lens unit 3. The lock pin 27 and the groove 37 function as a connection portion that connects the lock ring 25 and the lock lever 35.

After the initial state, by performing a locking control by the control unit, the motor 29 is driven to rotate the lock ring 25 in the direction D (see FIG. 8). Since the lock ring 25 rotates in the direction D, the projection 22 contacts the circumferential surface C. Accordingly, the lock ring 25 locks the vibration-proof compensation lens frame 11. In this manner, the lock ring 25 moves in the direction to connect with the vibration-proof compensation lens frame 11 to thereby restrict the movement of the vibration-proof compensation lens frame 11. In this case, since the lock pin 27 of the lock ring 25 rotates in the direction F (see FIGS. 10 and 11), the lock lever 35 connected to the lock ring 25 moves in the direction E. That is, the lock projection 36 of the lock lever 35 moves in the direction for connection with the lock groove 33. By the above control, the lock ring 25 locks the vibration-proof compensation lens frame 11 and the lock lever 35 locks the focus lens frame 12.

As described above, in the lens barrel 13, the lock ring 25 and the lock lever 35 are connected by the lock pin 27 and the groove 37 (e.g., the connection portion). Accordingly, when the motor 29 rotates the lock ring 25, the lock lever 35 interlocks with the lock ring 25 through the lock pin 27 and the groove 37. Thus, when the motor 29 moves the lock ring 25 in the direction for connection with the vibration-proof compensation lens frame 11, the lock lever 35 may be moved in the direction to connect with the focus lens frame 12. In this way, the vibration-proof compensation lens unit 2 and the focus lens unit 3 may be locked by using one motor 29. Thus, since only one actuator is used for locking, the cost and complexity of providing the actuator may be reduced. Accordingly, the manufacturing cost of the lens barrel 13 or the camera may be reduced. Also, since only one actuator is used for locking control, the control of the actuator for locking may be simplified. Since other effects are the same as those of Exemplary Embodiments 1 and 2, redundant descriptions thereof will be omitted for conciseness.

Exemplary Embodiment 4

Hereinafter, Exemplary Embodiment 4 will be described with reference to the drawings. In the present exemplary embodiment, a lens barrel 14 includes a diaphragm unit 4. The present exemplary embodiment represents a structure for locking the focus lens unit 3 by using a motor 49 for driving a shade blade of the diaphragm unit 4 as a power source thereof.

Figure 29:
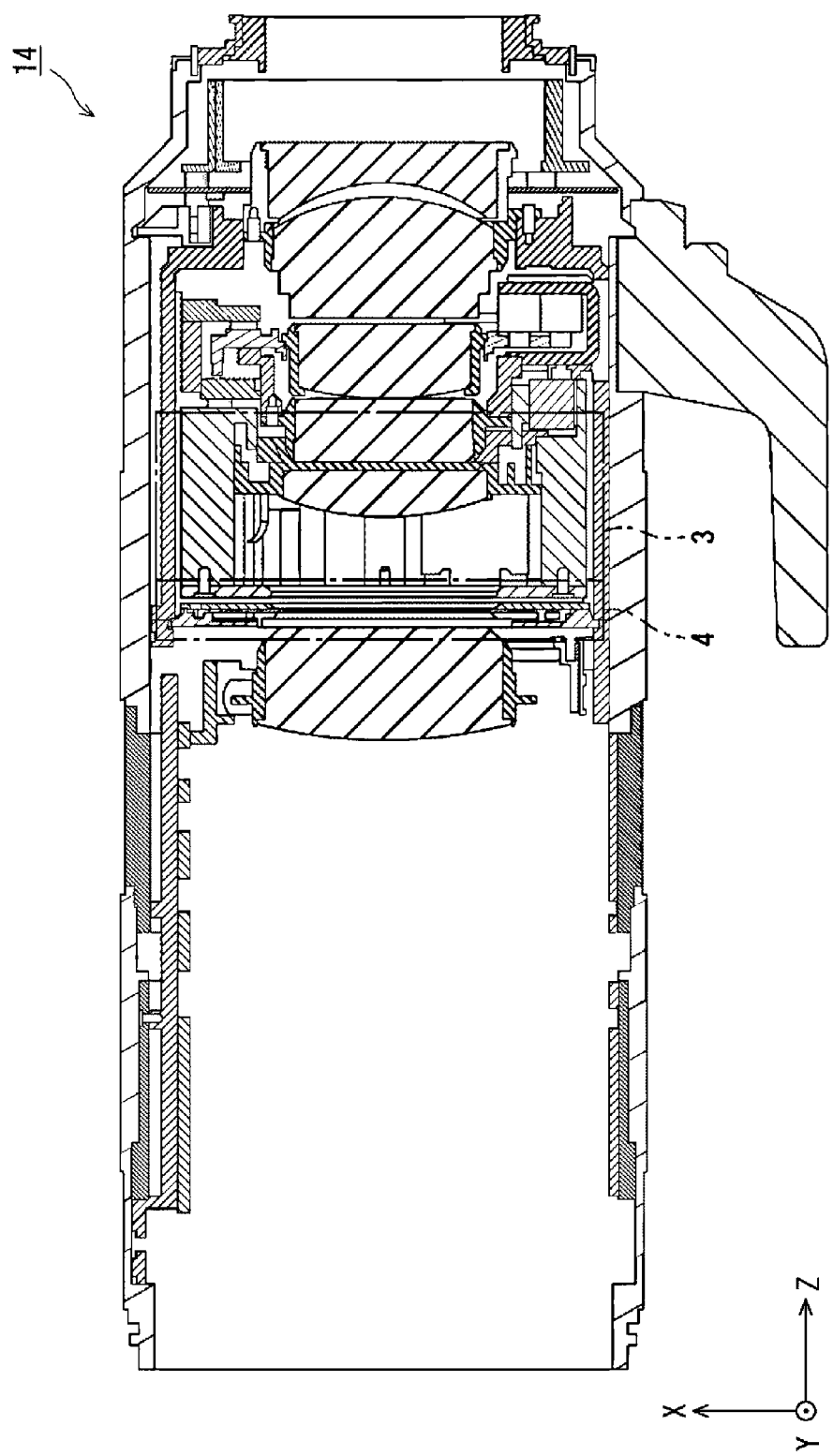
FIG. 29 is a cross-sectional view illustrating a lens barrel according to Exemplary Embodiment 4.

FIG. 29 is a cross-sectional view illustrating a lens barrel 14 according to Exemplary Embodiment 4. As illustrated in FIG. 29, a lens barrel 14 includes a diaphragm unit 4. The diaphragm unit 4 is disposed at the (−Z)-axis side of the focus lens unit 3.

Figure 30:
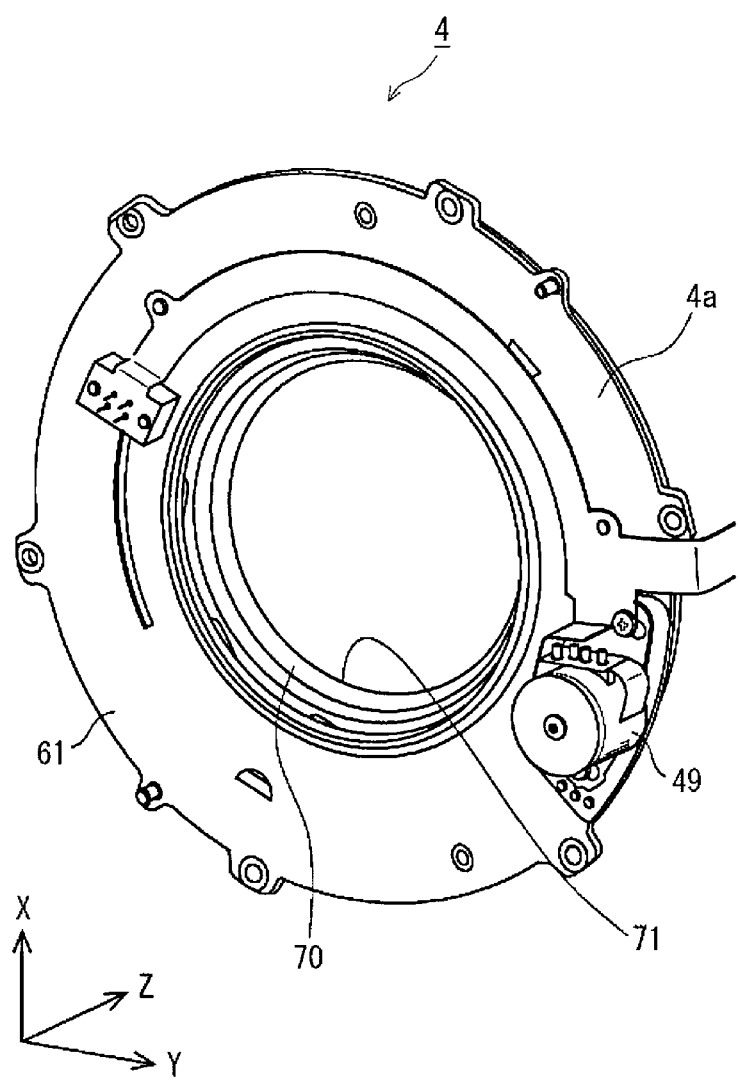
FIG. 30 is a perspective view illustrating a diaphragm unit according to Exemplary Embodiment 4.
Figure 31:
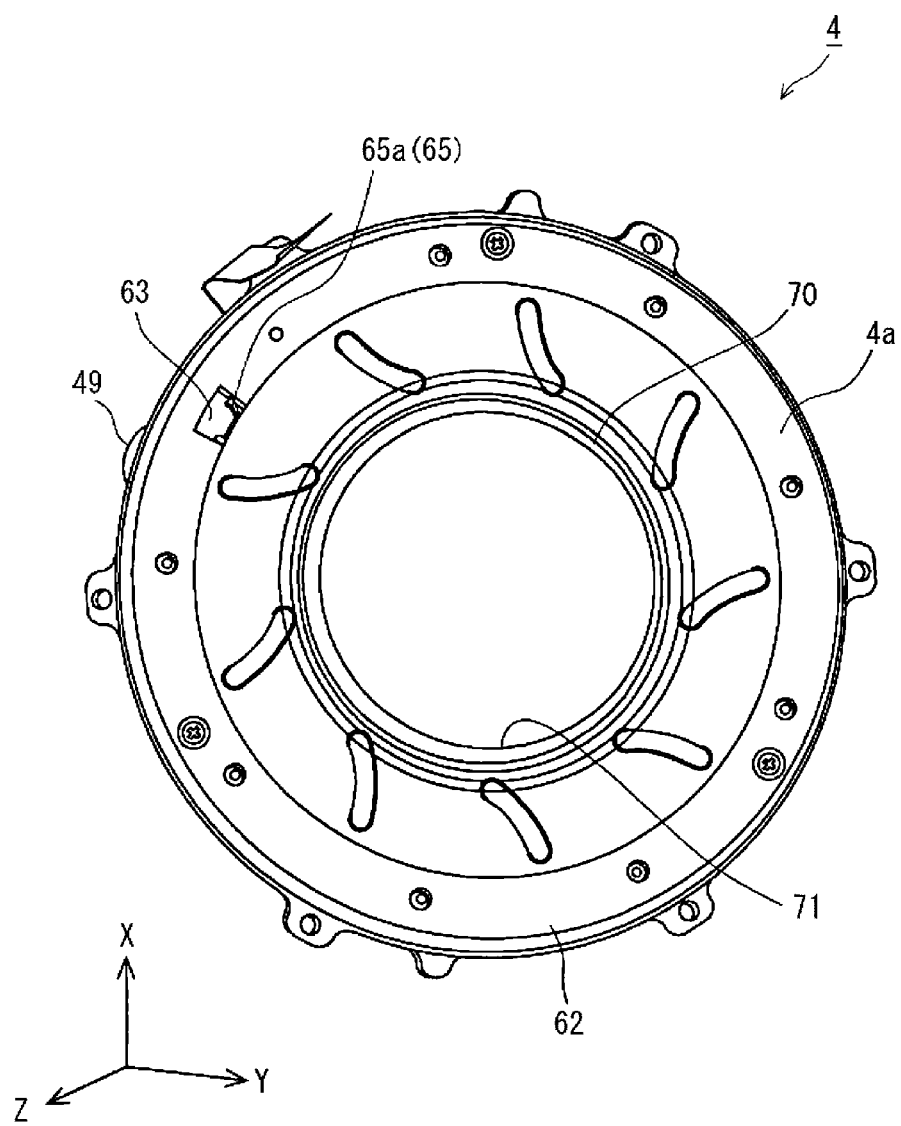
FIG. 31 is a perspective view illustrating a diaphragm unit according to Exemplary Embodiment 4.
Figure 32:
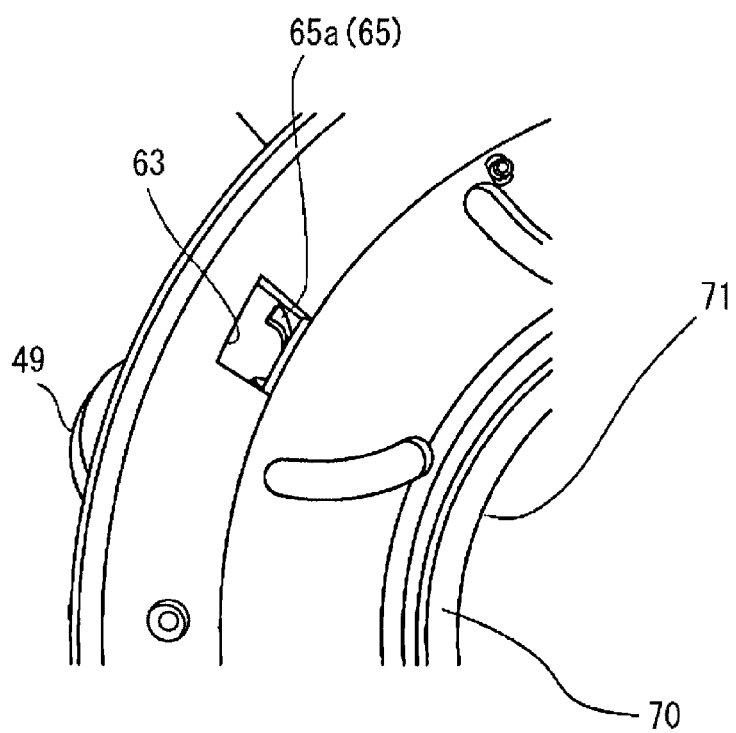
FIG. 32 is a view illustrating an insertion slot of a diaphragm unit according to Exemplary Embodiment 4.
Figure 33:
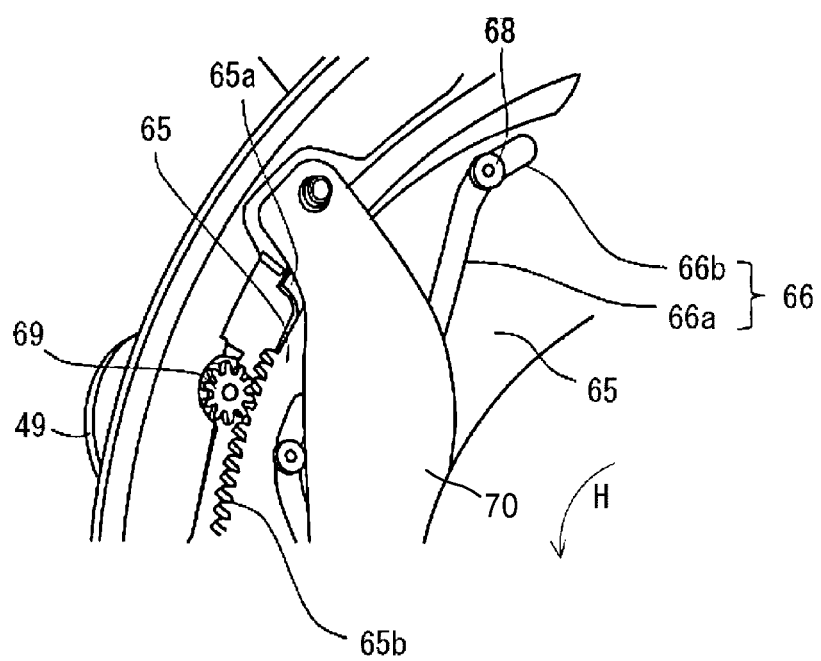
FIG. 33 is a perspective view illustrating an inside of the configuration illustrated in FIG. 32.
Figure 34:
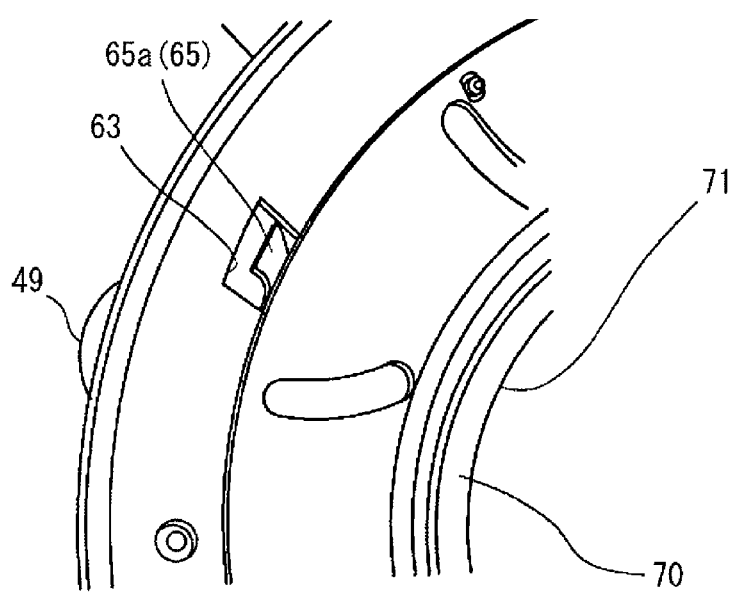
FIG. 34 is a view illustrating an insertion slot of a diaphragm unit according to Exemplary Embodiment 4.
Figure 35:
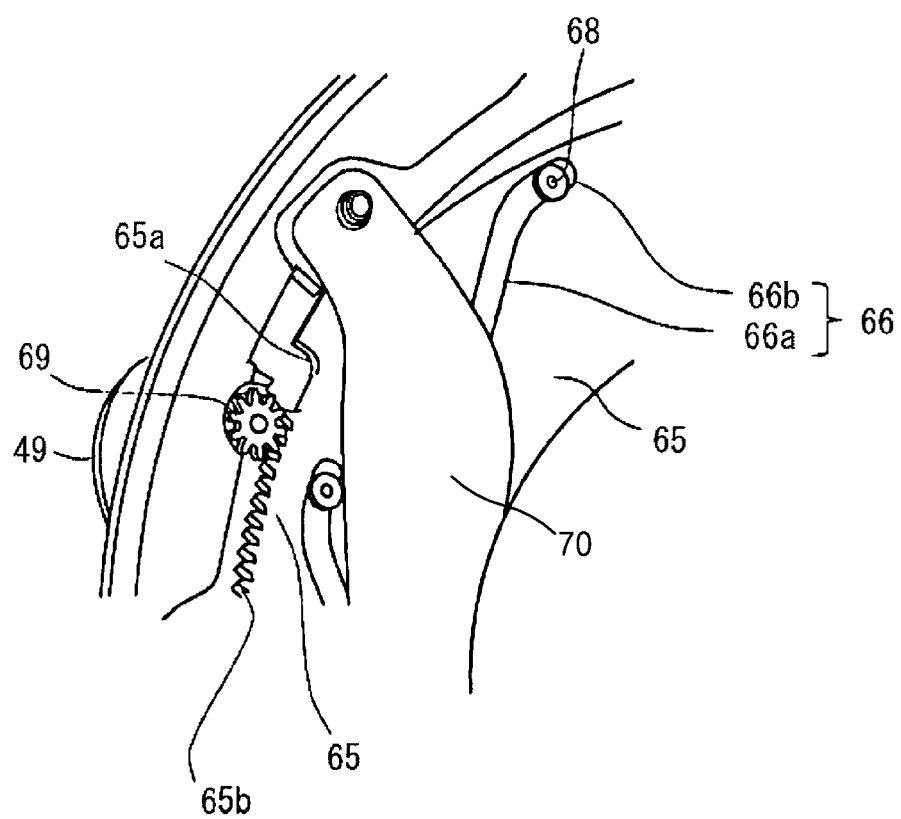
FIG. 35 is a perspective view illustrating an inside of the configuration illustrated in FIG. 34.

FIGS. 30 and 31 are perspective views illustrating a diaphragm unit 4 according to Exemplary Embodiment 4. FIGS. 32 and 34 are views illustrating an insertion slot 63 of a diaphragm unit 4 according to Exemplary Embodiment 4. FIGS. 33 and 35 are perspective views illustrating insides illustrated in FIGS. 32 and 34 respectively. As illustrated in FIGS. 30 to 35, the diaphragm unit 4 includes a main body 4a, a shade blade (shade member) 70, a blade drive plate (drive force transmission member) 65, and a motor (actuator) 49.

The main body 4a has a ring shape, and an opening 71 is formed at a center thereof around the optical axis. The main body 4a has a structure in which a ring-shaped cover 61 and a cover 62 are connected at an outer periphery thereof. The insertion slot 63 is formed near the outer periphery of the cover 62 facing the focus lens unit 3 (e.g., the cover 62 on the (+Z)-axis side).

The blade drive plate 65 has a ring-shaped plate surrounding the opening 71. The blade drive plate 65 is inserted into a gap between the cover 61 and the cover 62. A notch portion 65a is formed at a portion of the blade drive plate 65. The notch portion 65a is disposed at a position that may be viewed through the insertion slot 63 of the cover 62. A gear 65b is formed at a portion of the circumference of the blade drive plate 65. Accordingly, a drive force of the motor 49 is transmitted to the blade drive plate 65 through a gear 69 connected to the motor 49. Thus, the blade drive plate 65 rotates on the optical axis. A plurality of cam grooves 66 are formed at the blade drive plate 65. Each cam groove 66 includes a diaphragm portion 66a and an extension portion 66b. The cam groove 66 extends in the form of an arc, and the distance from the optical axis may vary according to the position thereof. The distance of the diaphragm portion 66a from the optical axis increases gradually along the arc. The distance of the extension portion 66b from the optical axis is uniformly large along the arc. In the cam groove 66, the diaphragm portion 66a and the extension portion 66b are smoothly connected together.

A plurality of shade blades 70 are installed around the opening 71 to surround the opening 71. Each shade blade 70 is connected to a shaft 68 inserted into each cam groove 66. The shaft 68 is movably inserted into the cam groove 66. When the blade drive plate 65 rotates, the shaft 68 moves along the cam groove 66. Since the shaft 68 moves along the cam groove 66, the shade blade 70 is pushed out to the opening 71 or returns to the circumference of the opening 71. Thus, the opening 71 is opened or closed by the shade blade 70.

For example, since the blade drive plate 65 rotates in a direction H with the shaft 68 located at the diaphragm portion 66a of the cam groove 66, the shaft 68 moves along the diaphragm portion 66a in the cam groove 66. The shaft 68 moves away from the optical axis. Accordingly, the shade blade 70 is pulled to the circumference of the opening 71 and thus the opening 71 is opened. On the other hand, when the blade drive plate 65 rotates in the reverse direction of the direction H, the shaft 68 moves away from the extension portion 66b along the diaphragm portion 66a in the cam groove 66. The shaft 68 moves toward the optical axis. Accordingly, the shade blade 70 is pushed out to the opening 71. Thus, the opening 71 is closed. However, the above rotation direction of the blade drive plate 65 and the above opening and closing operation of the opening 71 are merely exemplary, and the exemplary embodiments are not limited thereto.

When the blade drive plate 65 rotates in the direction H with the shaft 68 located at the extension portion 66b of the cam groove 66, the shaft 68 maintains a uniform distance with respect to the optical axis. Accordingly, the shade blade 70 maintains an open state of the opening 71. On the other hand, when the blade drive plate 65 rotates in the reverse direction of the direction H with the shaft 68 located at the extension portion 66b of the cam groove 66, the shaft 68 maintains a uniform distance with respect to the optical axis. Accordingly, the shade blade 70 maintains an open state of the opening 71.

In the present exemplary embodiment, the motor 49 is installed to drive the blade drive plate 65 of the diaphragm unit 4. The motor 49 may be, for example, a step motor, although is not limited thereto. The motor 49 is disposed on the cover 61 of the diaphragm unit 4. The motor 49 rotates the blade drive plate 65 through the gear 69. Accordingly, the shaft 68 inserted into the cam groove 66 is moved. Thus, the shade blade 70 may be opened or closed. In this manner, the blade drive plate 65 transmits the drive force of the motor 49 to the shade blade 70.

The distance of the shaft 68 from the optical axis is uniform in the extension portion 66b of the cam groove 66. Thus, the drive force for opening or closing the shade blade 70 is not applied to the shaft 68. In this case, the notch portion 65a of the blade drive plate 65 is separated from the insertion slot 63. In the present exemplary embodiment, by using the notch portion 65a, the movement of the lock lever 35 in the focus lens unit 3 is interlocked with the movement of the blade drive plate 65.

Figure 36:
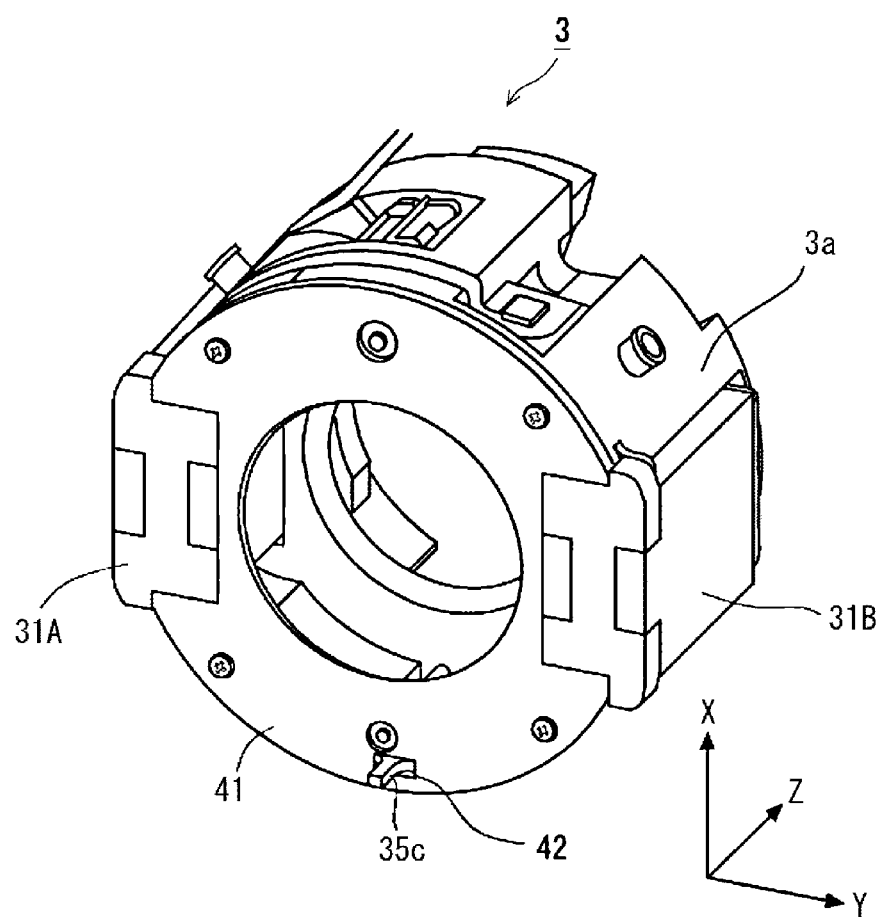
FIG. 36 is a perspective view illustrating a focus lens unit according to Exemplary Embodiment 4.
Figure 37:
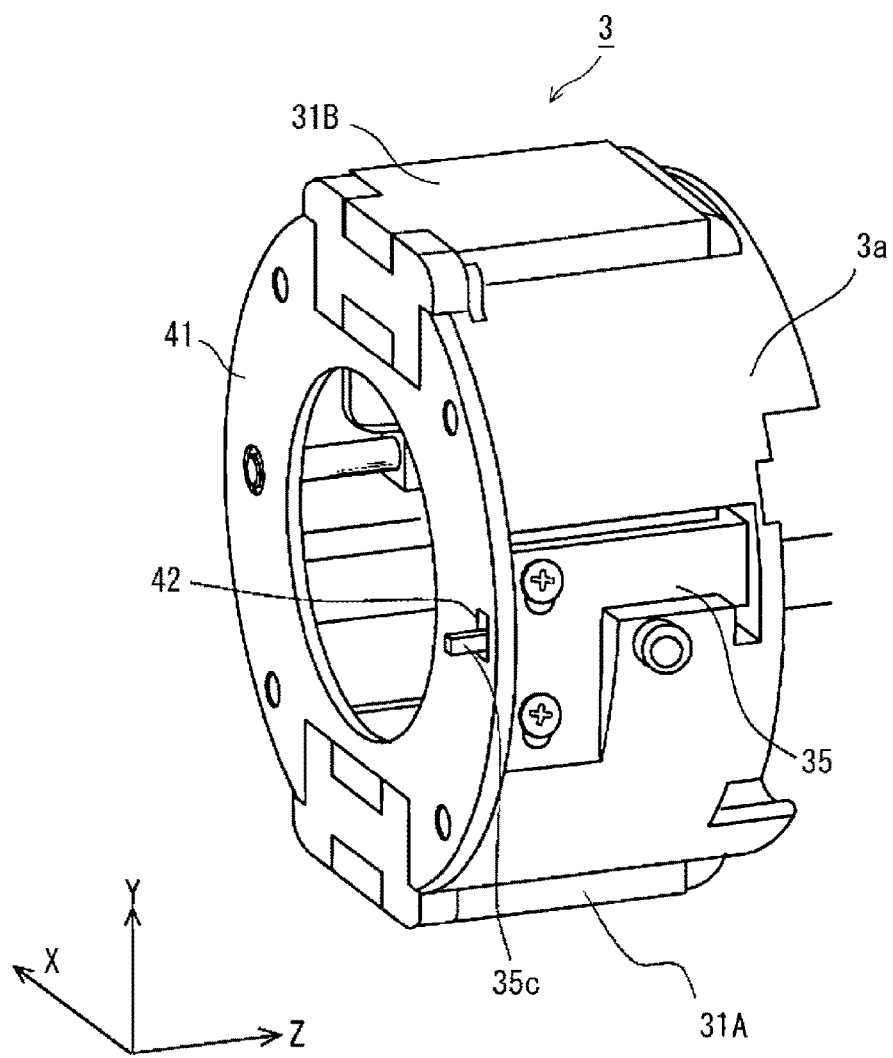
FIG. 37 is another perspective view illustrating a focus lens unit according to Exemplary Embodiment 4.
Figure 38:
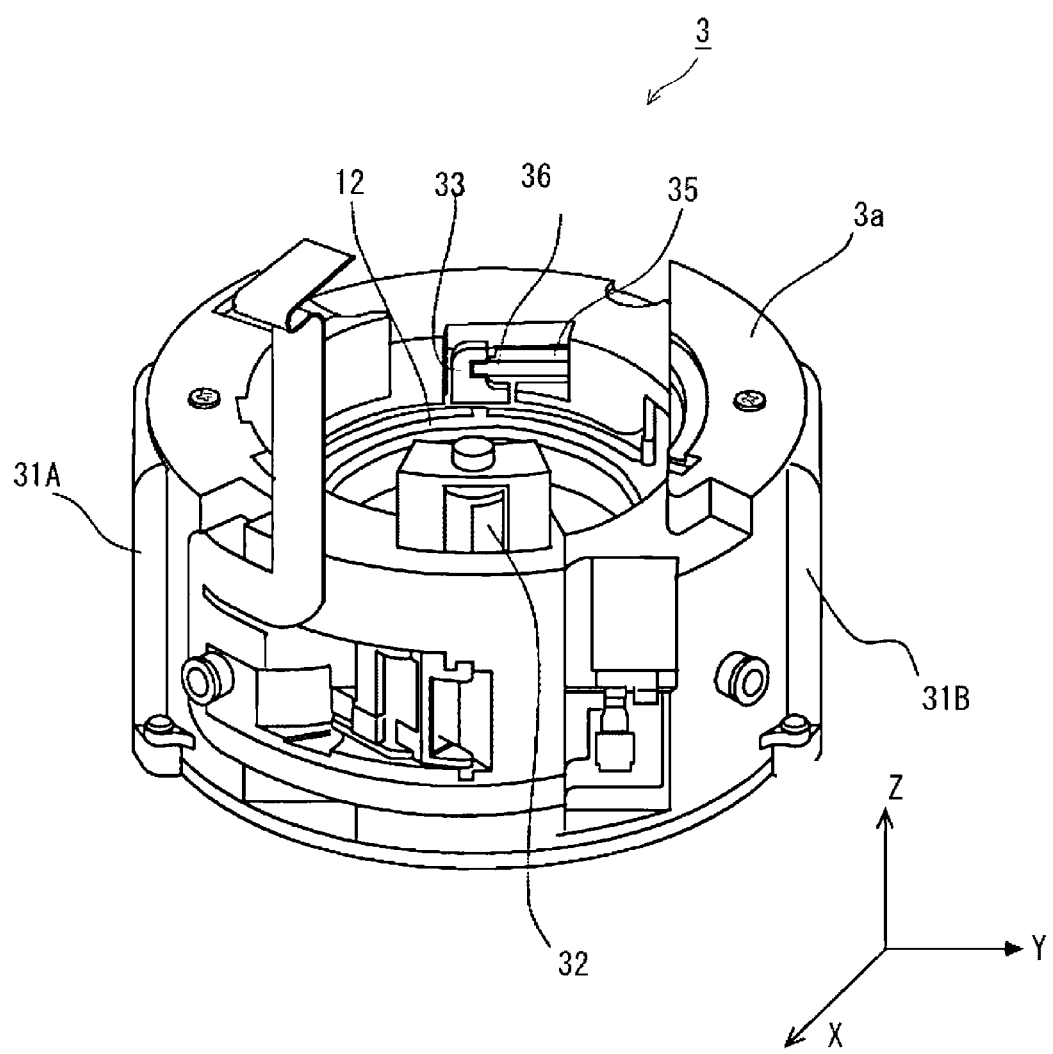
FIG. 38 is another perspective view illustrating a focus lens unit according to Exemplary Embodiment 4.
Figure 39:
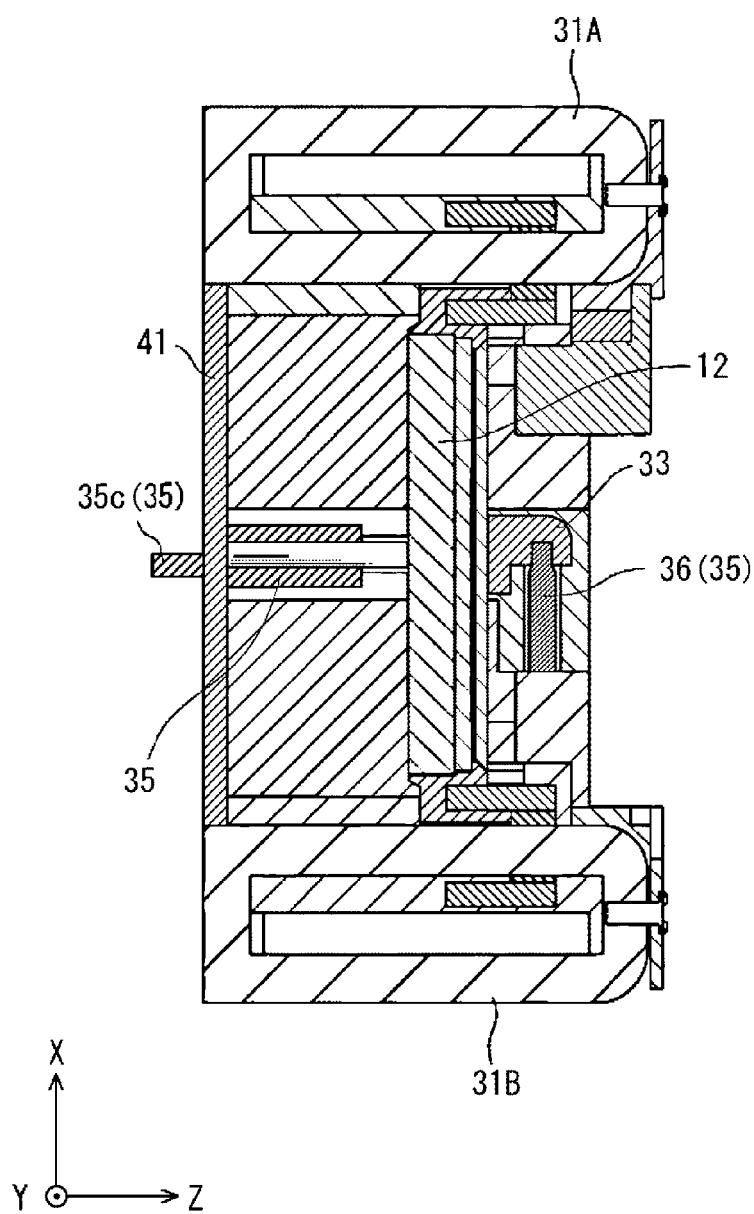
FIG. 39 is a cross-sectional view illustrating a focus lens unit according to Exemplary Embodiment 4.

FIGS. 36 to 38 are perspective views illustrating a focus lens unit 3 according to Exemplary Embodiment 4. FIG. 39 is a cross-sectional view illustrating a focus lens unit 3 according to Exemplary Embodiment 4. As illustrated in FIGS. 36 to 39, in the focus lens unit 3 according to the present exemplary embodiment, the lock lever 35 may be installed in a groove formed at a side surface of the main body 3a. The lock lever 35 is formed to extend in the Z-axis direction. A protrusion portion 35c is disposed at an end portion of the lock lever 35 in the (−Z)-axis direction. A lock projection 36 is disposed at an end portion of the lock lever 35 in the (+Z)-axis direction. The lock projection 36 faces the lock groove 33 in the focus lens frame 12. The lock lever 35 rotates and moves along the side surface of the main body 3a in a rotation direction with the optical axis as a rotation axis.

A hole 42 is formed at a surface 41 on the (−Z)-axis side in the main body 3a. The protrusion portion 35c of the lock lever 35 protrudes in the (−Z)-axis direction from the hole 42. Since the protrusion portion 35c and the lock projection 36 are a portion of the lock lever 35, the lock projection 36 of the lock lever 35 also moves along with the movement of the protrusion portion 35c. Also, the bridge 34a and the groove 37 are not formed in the present exemplary embodiment.

Other components of the focus lens unit 3, that is, the focus lens frame 12, the focus lens group, and the VCMs 31A and 31B, are the same as those in Exemplary Embodiment 3. Also, similar to Exemplary Embodiment 3, the motor 39 is not installed in the present exemplary embodiment.

A process of locking the focus lens unit 3 by using one motor 49 for opening or closing the shade blade 70 of the diaphragm unit 4 will be described below.

Figure 40:
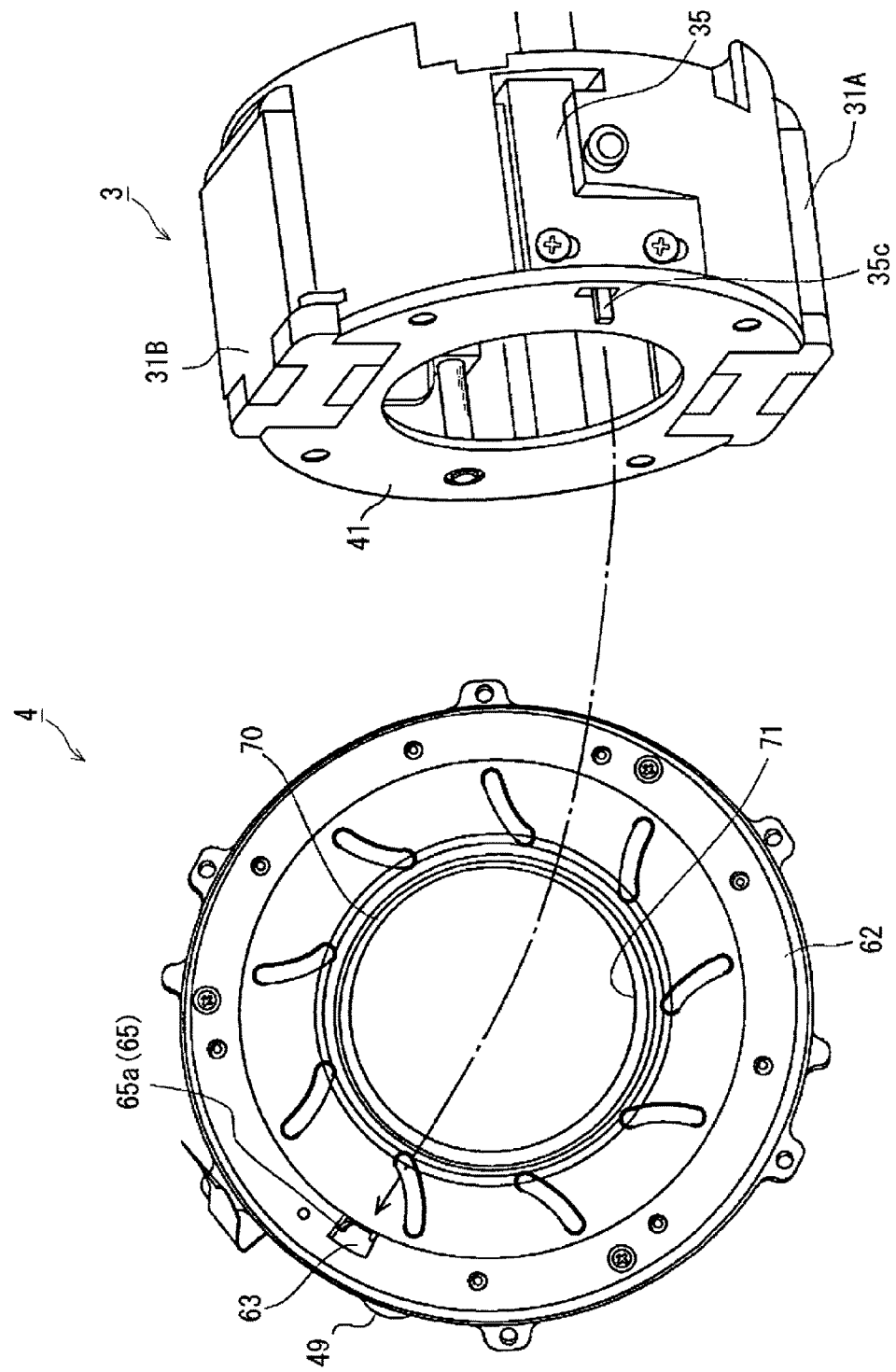
FIG. 40 is a view illustrating an operation of a focus lens unit and a diaphragm unit according to Exemplary Embodiment 4.

FIG. 40 is a view illustrating an operation of a focus lens unit 3 and a diaphragm unit 4 according to Exemplary Embodiment 4. As illustrated in FIG. 40, the protrusion portion 35c of the lock lever 35 of the focus lens unit 3 is connected to the notch portion 65a of the blade drive plate 65 through the insertion slot 63 of the diaphragm unit 4. In this way, the blade drive plate 65 and the lock lever 35 are connected together.

When the VCMs 31A and 31B are powered off by a control operation, the motor 49 is driven to rotate the blade drive plate 65. The shaft 68 moves toward the extension portion 66b from the diaphragm portion 66a of the cam groove 66. Accordingly, the shade blade 70 is pulled to the circumference of the opening 71 and thus the opening 71 is opened. In this state, when the blade drive plate 65 further rotates, the shaft 68 moves from the extension portion 66b of the cam groove 66. In this case, even when the blade drive plate 65 rotates, the drive force is not transmitted to the shade blade 70. In this manner, the rotation movement of the blade drive plate 65 has a drive force transmission state of transmitting the drive force to the shade blade 70 and a drive force non-transmission state of not transmitting the drive force to the shade blade 70. The rotation movement of the notch portion 65a in the drive force non-transmission state accompanies the rotation movement of the protrusion portion 35c connected to the notch portion 65a. Accordingly, the drive force of the motor 49 is transmitted to the lock lever 35 through the protrusion portion 35c. Thus, the lock projection 36 of the lock lever 35 is connected to the lock groove 33. In this manner, in the case of the movement in the drive force non-transmission state, the lock lever 35 restricts the movement of the focus lens frame 12.

According to the present exemplary embodiment, the focus lens unit 3 may be locked by using only one motor 49 for driving the shade blade 70 of the diaphragm unit 4. Thus, both the high speed feature and the voiceless sound (or low noise) feature in the operation of the focus lens unit 3 may be simultaneously implemented while suppressing the cost increase even without increasing the size of the lens barrel 14. Other effects are the same as those in Exemplary Embodiments 1 to 3.

Exemplary Embodiment 5

Hereinafter, Exemplary Embodiment 5 will be described with reference to the drawings. The present exemplary embodiment represents a configuration for locking both the focus lens unit 3 and the vibration-proof compensation lens unit 2 by using only one motor 49 for driving the shade blade 70 of the diaphragm unit 4.

Figure 41:
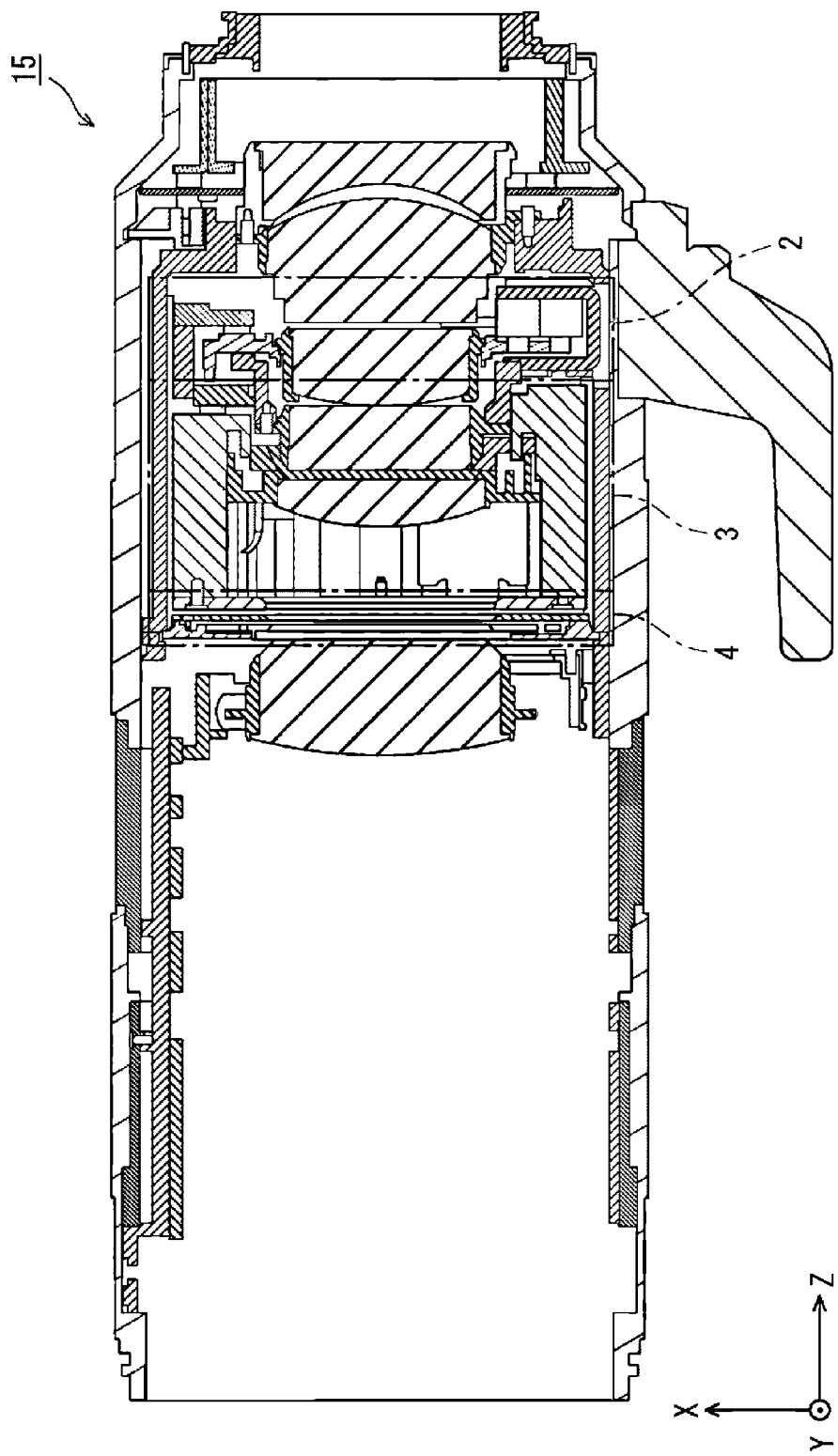
FIG. 41 is a cross-sectional view illustrating a lens barrel according to Exemplary Embodiment 5.

FIG. 41 is a cross-sectional view illustrating a lens barrel 15 according to Exemplary Embodiment 5. As illustrated in FIG. 41, the lens barrel 15 includes a diaphragm unit 4, a focus lens unit 3, and a vibration-proof compensation lens unit 2. The diaphragm unit 4 is disposed at the (−Z)-axis side of the focus lens unit 3. The vibration-proof compensation lens unit 2 is disposed at the (+Z)-axis side of the focus lens unit 3.

Figure 42:
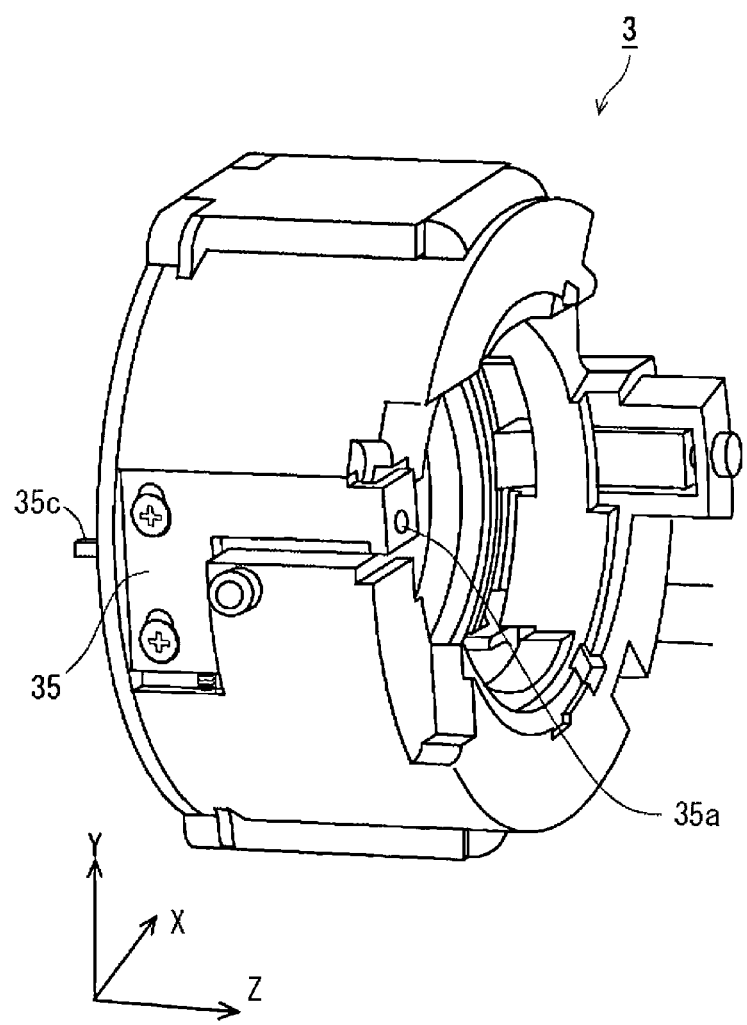
FIG. 42 is a perspective view illustrating a focus lens unit according to Exemplary Embodiment 5.

FIG. 42 is a perspective view illustrating a focus lens unit 3 according to Exemplary Embodiment 5.

As illustrated in FIG. 42, a lock lever 35 is installed at the focus lens unit 3. The lock lever 35 is installed in a groove formed at a side surface of the main body 3a and extends in the Z-axis direction. A protrusion portion 35c is disposed at a front end of the lock lever 35 on the (−Z)-axis side thereof. Also, a lock projection 36 is disposed on the (+Z)-axis side thereof. In the present exemplary embodiment, a lock hole 35a is installed at an end portion surface of the lock lever 35 on the (+Z)-axis side thereof. Other components of the focus lens unit 3 are the same as those in Exemplary Embodiment 4, and thus redundant descriptions thereof will be omitted for conciseness. Also, the components of the diaphragm unit 4 are the same as those in Exemplary Embodiment 4. The components of the vibration-proof compensation lens unit 2 are the same as those in Exemplary Embodiment 3.

A process of locking the focus lens unit 3 and the vibration-proof compensation lens unit 2 by using one motor 49 for opening or closing the shade blade 70 of the diaphragm unit 4 will be described below.

Figure 43:
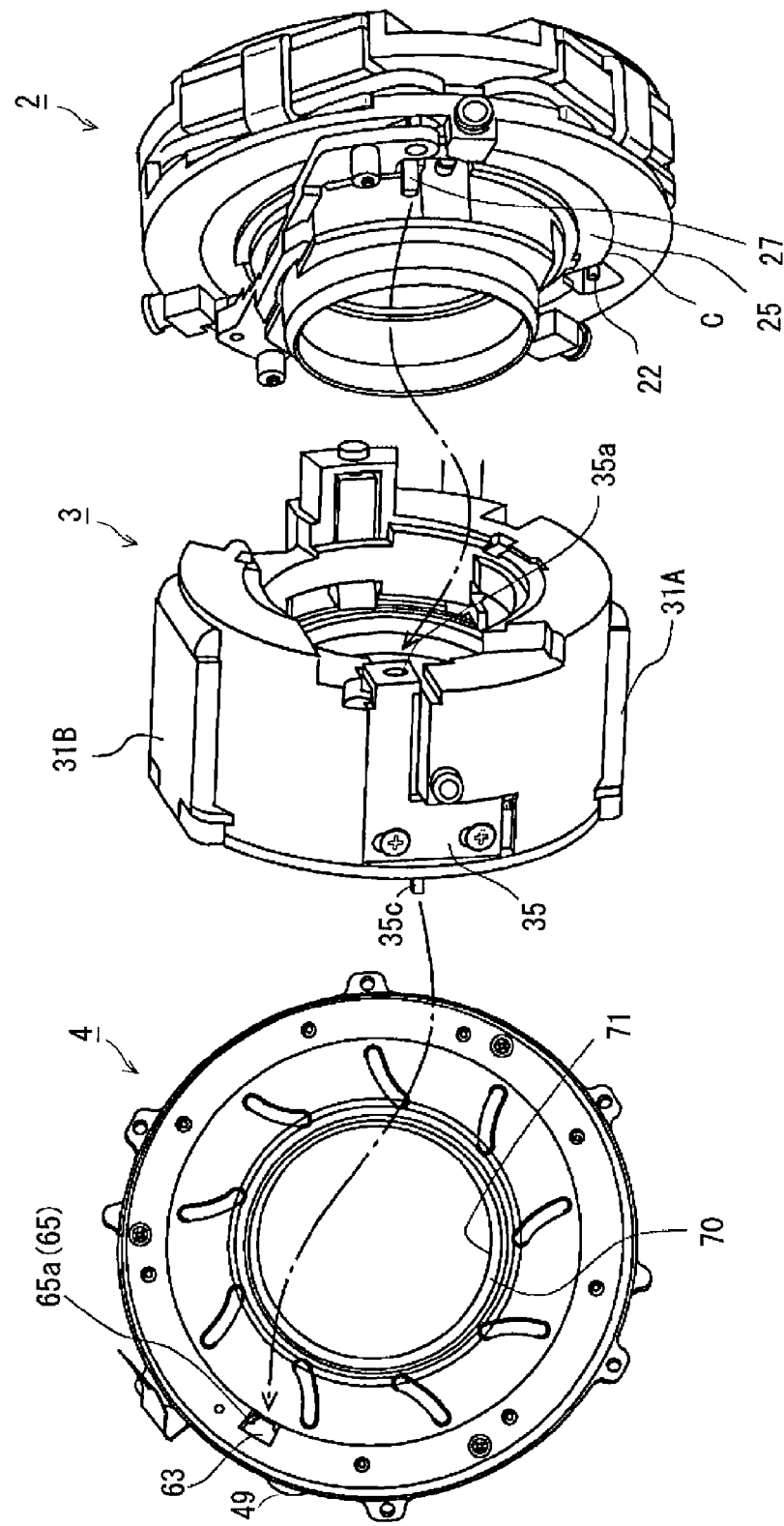
FIG. 43 is a view illustrating an operation of a vibration-proof compensation lens unit, a focus lens unit, and a diaphragm unit according to Exemplary Embodiment 5.

FIG. 43 is a view illustrating an operation of a vibration-proof compensation lens unit 2, a focus lens unit 3, and a diaphragm unit 4 according to Exemplary Embodiment 5. As illustrated in FIG. 43, the protrusion portion 35c installed at the lock lever 35 of the focus lens unit 3 is connected to the notch portion 65a of the blade drive plate 65 of the diaphragm unit 4 through the insertion slot 63. Also, the lock pin 27 installed at the lock ring 25 of the vibration-proof compensation lens unit 2 is connected to the lock hole 35a of the lock lever 35 of the focus lens unit 3. In this way, the blade drive plate 65 and the lock lever 35, and the lock lever 35 and the lock ring 25, are connected together.

When the VCMs 31A and 31B and the VCMs 21A and 21B are powered off by a control operation, the motor 49 is driven to rotate the blade drive plate 65. When the blade drive plate 65 rotates, the notch portion 65a formed at the blade drive plate 65 rotates. Along with the rotation movement of the notch portion 65a, the protrusion portion 35c contacting the notch portion 65a moves. Accordingly, the lock lever 35 also rotates and moves along the side surface of the main body 3a, and the lock projection 36 of the lock lever 35 is connected to the lock groove 33. Thus, the movement of the focus lens frame 12 in the Z-axis direction is restricted, and the focus lens unit 3 is locked.

Along with the movement of the lock lever 35, the lock pin 27 connected to the lock hole 35a of the lock lever 35 also rotates and moves. Accordingly, the lock ring 25 also moves and thus the circumferential surface C of the lock ring 25 restricts the movement of the projection 22 of the vibration-proof compensation lens frame 11. Thus, the vibration-proof compensation lens unit 2 is also locked.

In this manner, the present exemplary embodiment may lock both the focus lens unit 3 and the vibration-proof compensation lens unit 2 by using only one motor 49 for driving the shade blade 70 of the diaphragm unit 4. Thus, the exemplary embodiment may suppress cost without increasing the size of the lens barrel 15, may be used to simultaneously implement both the high speed feature and the voiceless sound (or low noise) feature in the operation of the focus lens unit 3, and may improve the response in the operation of the vibration-proof compensation lens unit 2. Other effects are the same as those in Exemplary Embodiments 1 to 4.

Exemplary Embodiments 1 to 5 described above may be combined in many different ways which would be understood by one of ordinary skill in the art. Also, the exemplary embodiments are not limited to the above exemplary embodiments and may be properly modified without departing from the spirit and scope of the exemplary embodiments. For example, the protrusion portion 35C may be installed at the blade drive plate 65 instead of at the lock lever 35, and the notch portion 65a may be installed at the lock lever 35 instead of at the blade drive plate 65. Also, the lock pin 27 may be installed at the lock lever 35 instead of at the lock ring 25, and the lock hole 35a may be installed at the lock ring 25 instead of at the lock lever 35.

According to the exemplary embodiments, it is possible to provide lens barrels and cameras that may reduce the cost and complexity caused by providing actuators for locking the movement of lenses.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A camera comprising a lens barrel comprising:
   a first lens frame that supports a first lens and is configured to move in a direction perpendicular to an optical axis of the lens barrel;
   a second lens frame that supports a second lens and is configured to move in an optical-axis direction which is parallel to the optical axis;
   a first lock member configured to move in a direction to connect with the first lens frame to restrict movement of the first lens frame in the direction perpendicular to the optical axis;
   a second lock member configured to move in a direction to connect with the second lens frame to restrict movement of the second lens frame in the optical-axis direction;
   a connection portion that connects the first lock member and the second lock member; and
   an actuator configured to move one of the first lock member and the second lock member and thereby control the first lock member and the second lock member to restrict the movement of the first lens frame and the second lens frame, respectively.

2. The camera of claim 1, wherein
   the first lock member is configured to rotate about the optical axis and is disposed concentrically with an optical-axis center of the first lens frame; and
   the first lock member is configured to restrict the movement of the first lens frame in the direction perpendicular to the optical axis by rotation about the optical axis.

3. The camera of claim 1, wherein the second lock member is configured to move in a direction which intersects with the optical axis to restrict the movement of the second lens frame in the optical-axis direction.

4. The camera of claim 1, wherein the connection portion comprises:
   a pin that is provided on the first lock member; and
   a groove that is provided on the second lock member and extends in a direction intersecting with the movement direction of the second lock member and into which the pin is inserted.

5. The camera of claim 1, wherein the second lock member is configured to restrict the movement of the second lens frame in the optical-axis direction after the first lock member restricts the movement of the first lens frame in the direction perpendicular to the optical axis.

6. The camera of claim 1, wherein the first lock member is configured to restrict the movement of the first lens frame in the direction perpendicular to the optical axis after the second lock member restricts the movement of the second lens frame in the optical-axis direction.

7. The camera of claim 2, wherein
   the first lens frame comprises projections protruding in the optical-axis direction, and
   the first lock member comprises:
      contact portions at an outer peripheral surface of the first lock member, the contact portions being configured to respectively contact the projections; and
      concave noncontact portions at the outer peripheral surface of the first lock member, the concave noncontact portions being configured to remain spaced apart from the projections; and
   by the rotation of the first lock member, the contact portions of the first lock member are brought into contact respectively with the projections of the first lens frame to restrict the movement of the first lens frame in the direction perpendicular to the optical axis.

8. The camera of claim 3, wherein
   one of the second lock member and the second lens frame comprises a lock projection extending in the direction intersecting with the optical axis;

the other one of the second lock member and the second lens frame comprises a lock groove to which the lock projection is connectable; and the lock projection is configured to connect to the lock groove based on the movement of the second lock member in the direction to connect with the second lens frame, to restrict the movement of the second lens frame in the optical-axis direction.

9. The camera of claim 7, further comprising a third lock member that interlocks with the first lock member, is movable in the optical-axis direction, and has a hole formed therein that is configured to receive at least one of the projections.

10. The camera of claim 9, wherein the third lock member is configured to move in the optical-axis direction in an interlocking fashion with the first lock member according to rotation of the first lock member; and the hole is fitted to the projection based on the movement of the third lock member in the optical-axis direction, to restrict the movement of the first lens frame in the direction perpendicular to the optical axis.

11. The camera of claim 10, further comprising:

a cam groove provided on the first lock member and extending in a circumferential direction of the first lock member; and a follow pin provided on the third lock member, the follow pin being configured to follow a path of the cam groove;

wherein the follow pin is configured to move in the optical-axis direction along the cam groove based on the rotation of the first lock member.

12. A lens barrel comprising:

a first lens frame that supports a first lens and is configured to move in a direction perpendicular to an optical axis of the lens barrel;

a second lens frame that supports a second lens and is configured to move in an optical-axis direction which is parallel to the optical axis;

a first lock member configured to move in a direction to connect with the first lens frame to restrict movement of the first lens frame in the direction perpendicular to the optical axis;

a second lock member configured to move in a direction to connect with the second lens frame to restrict movement of the second lens frame in the optical-axis direction;

a connection portion that connects the first lock member to the second lock member; and an actuator configured to move one of the first lock member and the second lock member and thereby control the first lock member and the second lock member to restrict the movement of the first lens frame and the second lens frame, respectively.

13. A lens barrel comprising:

a first lens frame configured to move in a first direction;

a second lens frame configured to move in a second direction different from the first direction;

a first lock member configured to perform a linear movement and lock a position of the first lens frame based on the linear movement; and a second lock member configured to perform a rotational movement based on the linear movement and lock a position of the second lens frame based on the rotational movement.

14. The lens barrel of claim 13, wherein:

the first lock member comprises a groove formed on a surface of the first lock member; and the second lock member comprises a protruding portion which protrudes into the groove to thereby connect the second lock member to the first lock member such that the second lock member performs the rotational movement simultaneously when the first lock member performs the linear movement.

15. The lens barrel of claim 14, wherein:

the first lock member comprises a lock projection configured to fit inside a lock groove to thereby lock the position of the first lens frame;

the second lock member comprises a ring-shaped component having a portion configured to contact a protrusion to thereby lock the position of the second lens frame; and a first movement distance to fit the lock projection inside the lock groove is different from a second movement distance for the portion to contact the protrusion.

* * * * *